(12) United States Patent
Hsu et al.

(10) Patent No.: US 9,130,605 B2
(45) Date of Patent: Sep. 8, 2015

(54) SYSTEMS AND METHODS FOR COEXISTENCE BETWEEN PLURALITY OF WIRELESS COMMUNICATIONS MODULES SHARING SINGLE ANTENNA

(75) Inventors: Hong-Kai Hsu, Taipei County (TW); Yuan-Hung Chung, Hsinchu County (TW); Hsien-Chyi Chiou, Hsinchu (TW); Wei Wang, Taichung (TW); Wen-Ying Chien, Hsinchu (TW); Jwo-An Lin, Taipei (TW); I-Lin Hsieh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 809 days.

(21) Appl. No.: 12/625,613

(22) Filed: Nov. 25, 2009

(65) Prior Publication Data
US 2011/0009074 A1 Jan. 13, 2011

Related U.S. Application Data

(60) Provisional application No. 61/224,107, filed on Jul. 9, 2009.

(51) Int. Cl.
*H04B 1/44* (2006.01)
*H04B 1/00* (2006.01)
*H04W 72/12* (2009.01)
*H04W 88/06* (2009.01)

(52) U.S. Cl.
CPC ........... *H04B 1/006* (2013.01); *H04W 72/1215* (2013.01); *H04W 88/06* (2013.01)

(58) Field of Classification Search
CPC .. H04W 88/06; H04W 48/18; H04W 72/1215
USPC .......................................................... 455/73
See application file for complete search history.

(56) References Cited

U.S. PATENT DOCUMENTS

| 6,970,681 | B2 | 11/2005 | Darabi et al. |
| 7,561,852 | B2 | 7/2009 | Darabi et al. |
| 7,818,029 | B2 * | 10/2010 | Sanguinetti ................ 455/552.1 |
| 2003/0103647 | A1 | 6/2003 | Rui et al. |
| 2005/0148370 | A1 * | 7/2005 | Moldoveanu et al. ..... 455/562.1 |

(Continued)

FOREIGN PATENT DOCUMENTS

WO WO 2008127993 10/2008

OTHER PUBLICATIONS

German language office action dated Mar. 4, 2011.

(Continued)

*Primary Examiner* — Ayodeji Ayotunde
(74) *Attorney, Agent, or Firm* — McClure, Qualey & Rodack, LLP

(57) ABSTRACT

A system for the coexistence between a plurality of wireless communications modules sharing single antenna is provided. A wireless communications chipset includes a first wireless communications module configured to transmit or receive first wireless communications signals, and a second wireless communications module configured to transmit or receive second wireless communications signals. A path selection circuit is configured to connect the first wireless communications module to the antenna via a first transceiving path or a second transceiving path for transmitting and receiving the first wireless signals according to transceiving statuses of the first wireless signals and the second wireless signals.

30 Claims, 25 Drawing Sheets

(56) References Cited

U.S. PATENT DOCUMENTS

| | | | |
|---|---|---|---|
| 2006/0009256 A1* | 1/2006 | Frank et al. | 455/556.1 |
| 2006/0056372 A1* | 3/2006 | Karaoguz et al. | 370/339 |
| 2007/0223615 A1* | 9/2007 | Dosanjh et al. | 375/267 |
| 2008/0102885 A1* | 5/2008 | Tu et al. | 455/553.1 |
| 2008/0130603 A1 | 6/2008 | Wentink et al. | |
| 2008/0139118 A1* | 6/2008 | Sanguinetti | 455/41.2 |
| 2008/0139151 A1* | 6/2008 | Ojo et al. | 455/234.1 |
| 2008/0192806 A1* | 8/2008 | Wyper et al. | 375/133 |
| 2008/0253345 A1* | 10/2008 | Sanguinetti | 370/339 |
| 2009/0168650 A1* | 7/2009 | Kesselman | 370/235 |
| 2009/0262042 A1* | 10/2009 | Li et al. | 343/876 |
| 2009/0262669 A1* | 10/2009 | Sanders | 370/278 |
| 2010/0137024 A1* | 6/2010 | Maguire | 455/552.1 |

OTHER PUBLICATIONS

English language translation of office action.
Yick, J., et al.; "Wireless Sensor Network Survey," Computer Networks; Apr. 2008; pp. 2292-2330.

* cited by examiner

SYSTEMS AND METHODS FOR COEXISTENCE BETWEEN PLURALITY OF WIRELESS COMMUNICATIONS MODULES SHARING SINGLE ANTENNA

CROSS REFERENCE TO RELATED APPLICATIONS

This application claims the benefit of U.S. Provisional Application No. 61/224,107, filed on Jul. 9, 2009, the entirety of which is incorporated by reference herein.

BACKGROUND OF THE INVENTION

1. Field of the Invention

The invention relates generally to the coexistence between a plurality of wireless communications modules, and more particularly, to systems and methods for the coexistence between a plurality of wireless communications modules sharing a single antenna.

2. Description of the Related Art

To an increasing extent, a multitude of communication functions are being merged into mobile devices. As shown in FIG. 1, a cellular phone may connect to a wireless local area network (WLAN) via a Wireless Fidelity (WiFi) module thereof and simultaneously communicate with a Bluetooth (BT) handset (or a Bluetooth car audio, or others) through a Bluetooth module thereof. A WLAN system is typically implemented inside buildings as an extension to wired local area networks (LANs) and is able to provide the last few meters of connectivity between a wired network and mobile or fixed devices. According to the IEEE 802.11 standard, most WLAN systems may operate in the 2.4 GHz license-free frequency band and have very low throughput rates because of the coexistence interference from BT. Referring to FIG. 1, a WLAN is established by an access point (AP) connecting to a LAN by an Ethernet cable. The AP typically receives, buffers, and transmits data between the WLAN and the wired network infrastructure. The AP may support, on average, twenty devices and have a coverage varying from 20 meters in an area with obstacles (walls, stairways, elevators etc) to 100 meters in an area with clear line of sight. Bluetooth is an open wireless protocol for exchanging data over short distances from fixed and mobile devices, creating personal area networks (PANs). The cellular phone may receive the voice over internet protocol (VoIP) data via the WiFi module and further transmit the VoIP data through an established PAN to the Bluetooth handset, and vice versa. Alternatively, the cellular phone may transmit digital music through the established PAN to be played back in the Bluetooth handset. The WLAN and Bluetooth systems both occupy a section of the 2.4 GHz Industrial, Scientific, and Medical (ISM) band, which is 83 MHz-wide. Due to cost issues as well as space requirements for components, modern electronic devices, such as cellular phones, Ultra-Mobile PCs (UMPCs) or others, are equipped with WiFi and Bluetooth modules sharing a single antenna instead of multiple antennas.

As an example shown in FIG. 2, a Bluetooth system uses a Frequency Hopping Spread Spectrum (FHSS) and hops between 79 different 1 MHz-wide channels in a Bluetooth spectrum. A WLAN system uses a Direct Sequence Spread Spectrum (DSSS) instead of a FHSS. A WLAN system carrier remains centered on one channel, which is 22 MHz-wide. When the WiFi module and the Bluetooth module are operating simultaneously in the same area, as shown in FIG. 1, the single WLAN channel, which is 22 MHz-wide, occupies the same frequency space as 22 out of 79 Bluetooth channels which are 1 MHz-wide. When a Bluetooth transmission occurs on a frequency band that falls within the frequency space occupied by an ongoing WLAN transmission, a certain level of interference may occur, depending on the signal strength thereof. Due to the fact that the WiFi module and Bluetooth module share the same spectrum and also share a single antenna, avoiding interference therebetween is required.

FIG. 3 is a diagram illustrating an operation conflict which may occur between a WLAN and a Bluetooth communication services sharing a single antenna. In FIG. 3, the shared single antenna is switched between WLAN and Bluetooth communication services in a given time slot for transceiving data. If the Bluetooth communication service carries audio data that requires real-time transmission, the Bluetooth communication service would have a higher priority over the WLAN communication service. In this case, when a WLAN transceiving process takes place at the same time as the real-time Bluetooth transceiving process, the time slot will be assigned to the Bluetooth transceiving process and the WLAN transceiving process will be blocked. As shown in FIG. 3, the WLAN receiving operation (Rx operation) 1 occurs in the time slot, while the Bluetooth communication service is idle. Therefore, the Rx operation 1 is performed without interference and an acknowledgement (ACK) message 2 is sent to the WLAN AP (such as the AP in FIG. 1) as a reply message indicating that the Rx operation 1 is finished. Following the Rx operation 1, another WLAN Rx operation 3 is performed. The Rx operation 3 is also performed without interference because the Bluetooth communication service is in the idle state. However, an ACK message 4 in response to the Rx operation 3 can not be replied to the WLAN AP, as its time slot is already assigned to the Bluetooth transmitting operation (Tx operation). Accordingly, the Rx operation 3 would be determined to have failed. In response to the failure, the WLAN AP would re-sent the data with a lower data rate in an attempt to successfully transmit data to the WLAN module of the mobile device. Unfavorably, the re-performed Rx operation 3 (denoted as 5), with a prolonged operation period, will be more likely to overlap with the Bluetooth transceiving process. Another data re-sent with a lower data rate than that of the prior re-sent would be further attempted, causing more overlap with the Bluetooth transceiving process than the prior attempt. As a result, WLAN throughput is highly damaged as the WLAN and Bluetooth wireless communication services sharing a single antenna.

BRIEF SUMMARY OF THE INVENTION

In light of the previously described problems, there exists a need for a method and system, in which a plurality of wireless communication services may share a single antenna for simultaneous operations.

One aspect of the invention discloses a system for the coexistence between a plurality of wireless communications modules sharing single antenna, comprising an antenna, a wireless communications chipset, and a path selection circuit. The wireless communications chipset comprises a first wireless communications module configured to transmit or receive first wireless communications signals, and a second wireless communications module configured to transmit or receive second wireless communications signals. The path selection circuit is configured to connect the first wireless communications module to the antenna via a first transceiving path or a second transceiving path for transmitting and receiving the first wireless signals according to transceiving statuses of the first wireless signals and the second wireless signals.

Another aspect of the invention discloses a system for the coexistence between a plurality of wireless communications modules sharing single antenna, comprising an antenna, a path selection circuit, and a wireless communications chipset. The path selection circuit provides a first transceiving path and a second transceiving path, wherein signal passing through the first transceiving path has less signal loss than passing through the second transceiving path. The wireless communications chipset comprises a first port coupling the first transceiving path, a second port coupling the second transceiving path, a first wireless communications module coupling to the first and second ports, a control unit selectively enabling the first and second ports for a time period, enabling signal transmission or reception for the time period by the first wireless communications module via the first or second transceiving path.

Another aspect of the invention discloses a method for handling the coexistence between a plurality of wireless communications modules sharing single antenna, comprising determining whether a first wireless communications module is transmitting or receiving a first wireless signal, or a second wireless communications module is transmitting or receiving a second wireless signal; determining transceiving statuses of the first and second wireless signals; and connecting the first wireless communications module to an antenna via a first transceiving path or a second transceiving path for transmitting and receiving the first wireless signal according to the transceiving statuses.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
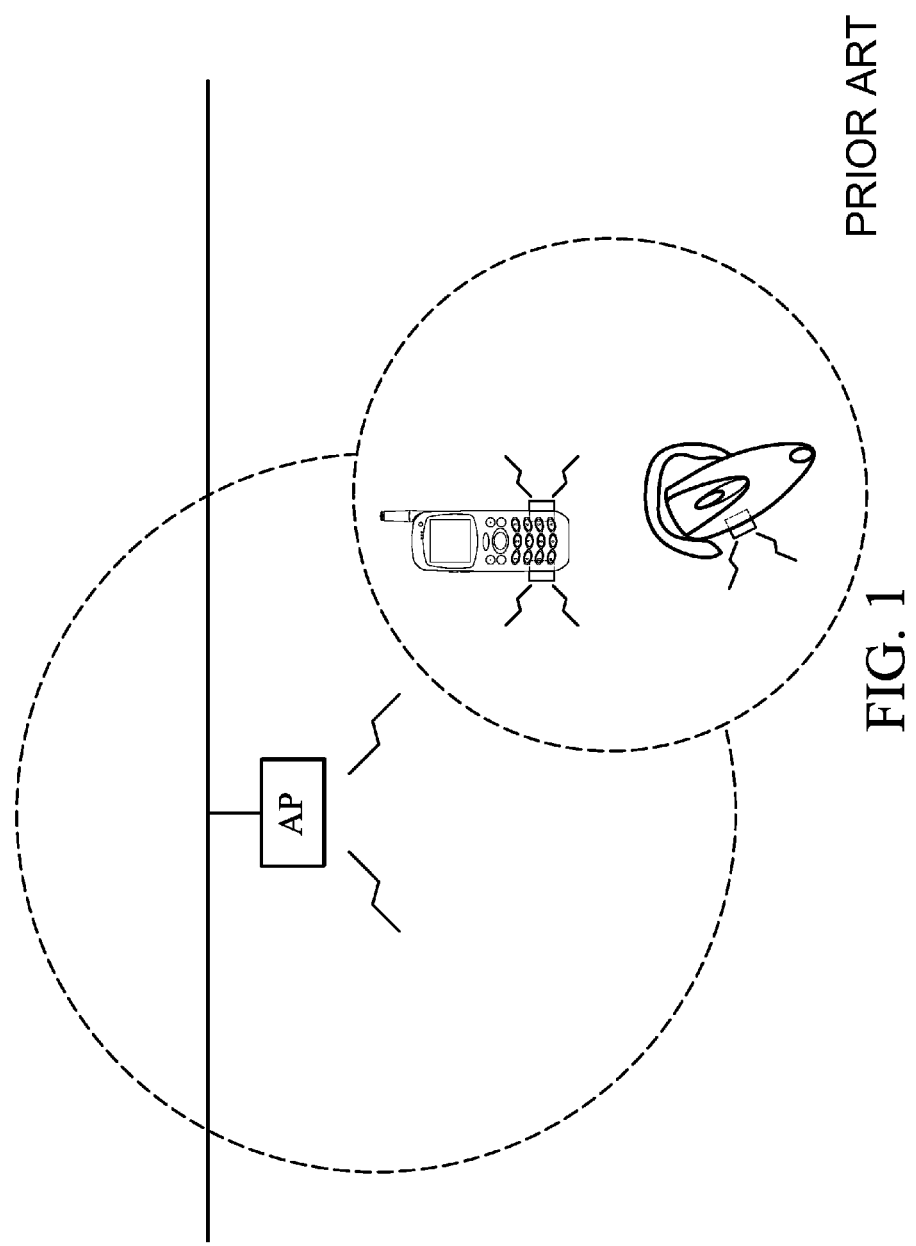
FIG. 1 shows a cellular phone connecting to a Wireless Local Area Network (WLAN) via a WLAN module thereof as well as communicating with a Bluetooth handset through a Bluetooth module thereof.
Figure 2:
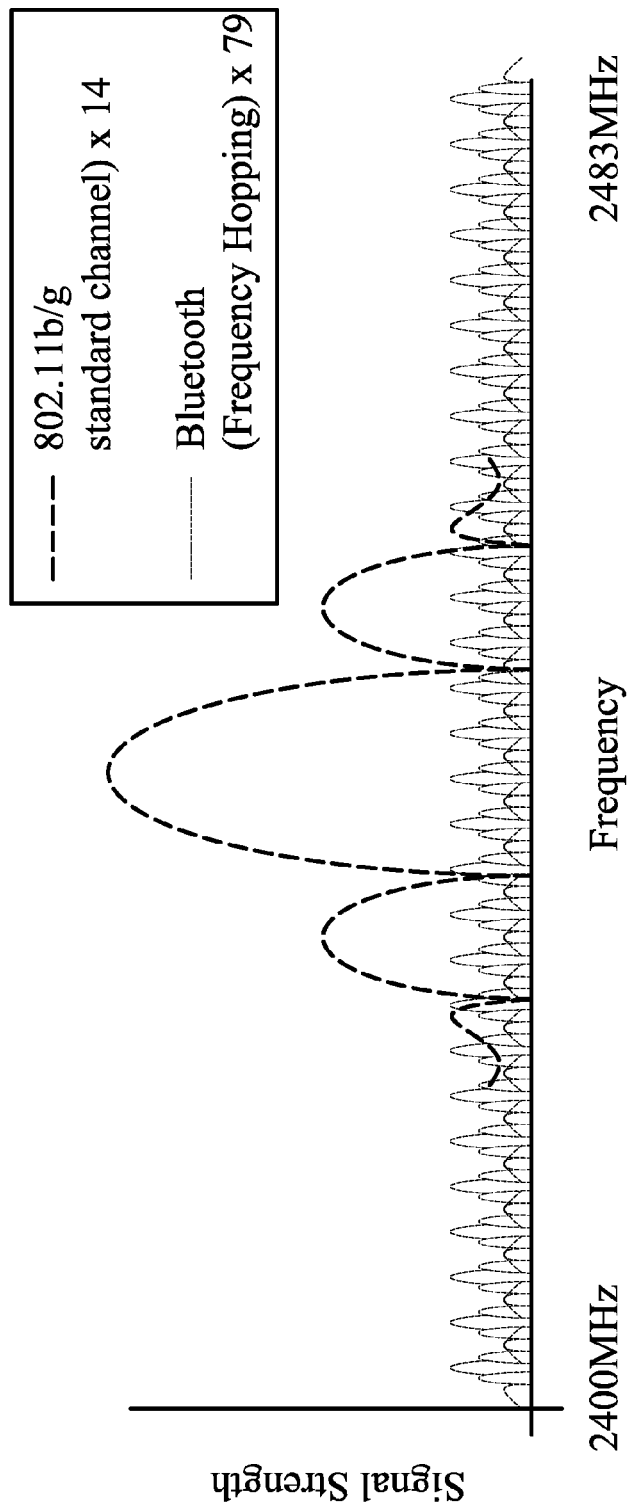
FIG. 2 shows a diagram of Bluetooth frequency Hopping.
Figure 3:
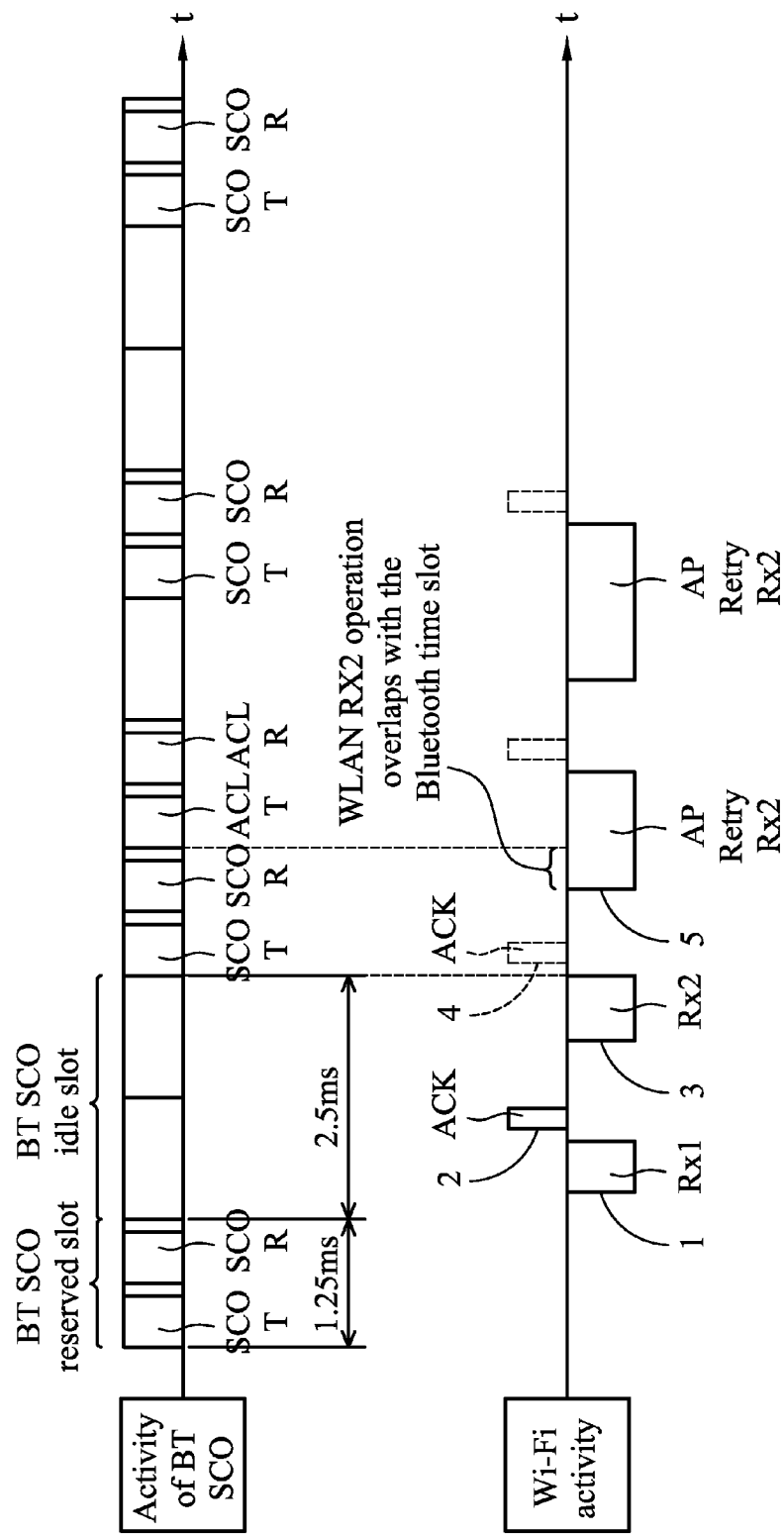
FIG. 3 shows a diagram illustrating an operation conflict between a WLAN and a Bluetooth wireless communication services sharing a single antenna.
Figure 4:
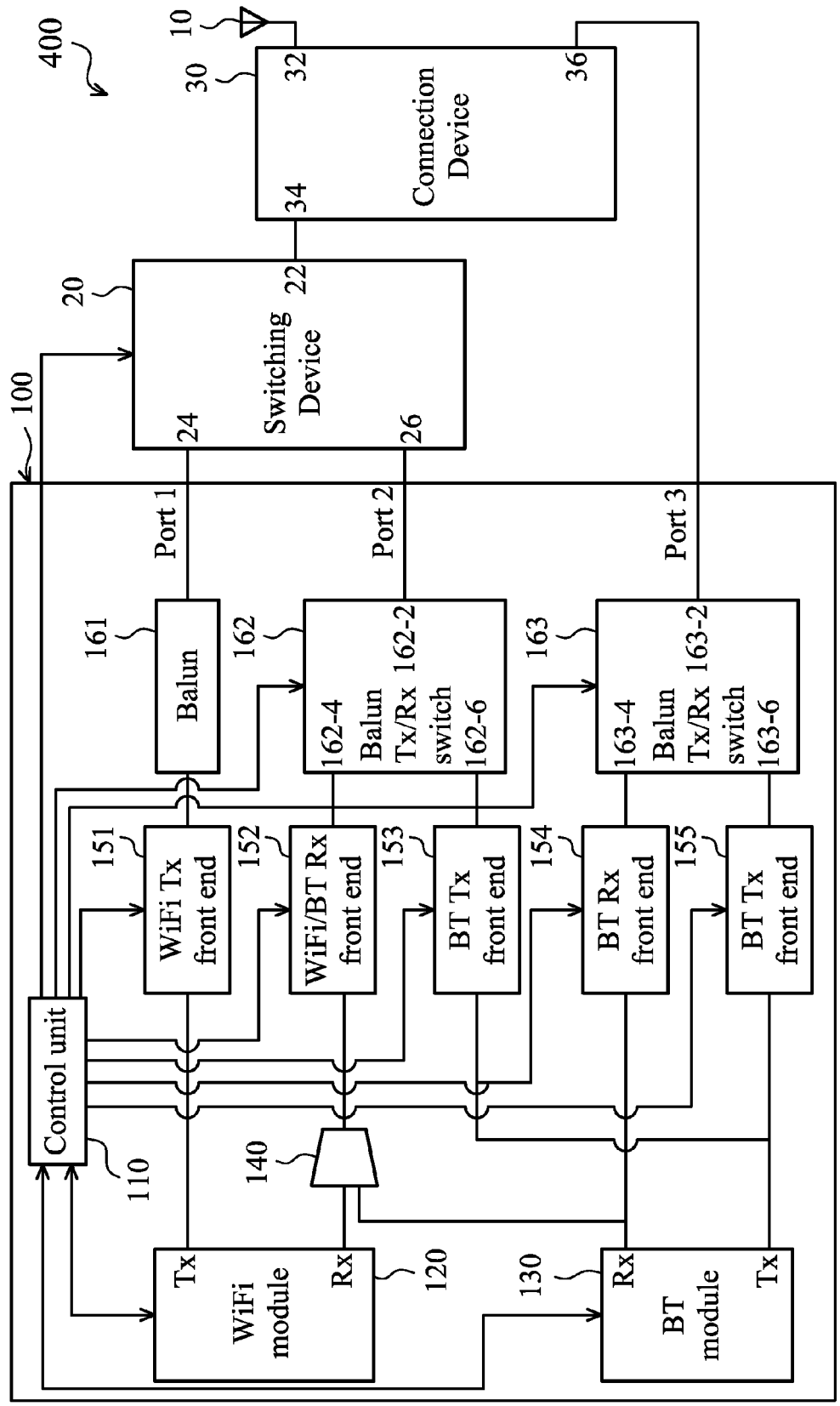
FIG. 4 shows a diagram illustrating a system for the coexistence between two wireless communications modules sharing single antenna in accordance with an embodiment of the invention.

FIG. 4 shows a diagram illustrating a system for the coexistence between two wireless communications modules sharing single antenna in accordance with an embodiment of the invention. The system 400 comprises an antenna 10, a switching device 20, a connection device 30 and a wireless communications chipset 100. The wireless communications chipset 100 comprises a control unit 110, a WiFi module 120, a BT module 130, a separator 140, a WiFi Tx front-end 151, a WiFi/BT Rx front-end 152, BT Tx front-ends 153 and 155, a BT Rx front-end 154, a balun unit 161, and balun-switch units 162 and 163. Each of the balun unit 161 and the balun-switch units 162 and 163 comprises a balun that is used to convert electrical signals that are balanced with respect to ground (differential) into signals that are unbalanced (single-ended) and vice versa. The balun unit 161 is connected as an input/output (I/O) port (port 1) of the wireless communications chipset 100. The balun-switch units 162 and 163 serve as another I/O ports (ports 2 and 3) of the wireless communications chipset 100. The switching device 20 and the connection device 30 may be integrated as a path selection circuit and disposed on a printed circuit board (PCB).

The WiFi Tx front-end 151 is connected to the WiFi module 120 and performs the front-end functions for transmission, such as modulation of the transmitting carrier signals. The WiFi/BT Rx front-end 152 is connected to the separator 140 and performs the front-end functions for reception, such as demodulation of the received carrier signals. The separator 140 is configured to separate the WiFi and BT Rx signals in the combined signals from the WiFi/BT Rx front-end 152, and to direct the separated WiFi and BT Rx signals to the WiFi module 120 and the BT module 130, respectively. Similarly, both the BT Tx front-ends 153 and 155 are connected to the BT module 130 and perform the front-end functions for transmission, and the BT Rx front-end 154 is connected to the BT module 130 and performs the front-end functions for reception. The operation states of the WiFi Tx front-end 151, the WiFi/BT Rx front-end 152, the BT Tx front-end 153, the BT Rx front-end 154, and the BT Tx front-end 155 are controlled by the control unit 110. By setting the operation state to "ON", the corresponding front-end unit will be activated. On the contrary, by setting the operation state to "OFF", the corresponding front-end unit will be deactivated. Or, alternatively, the operation state may be set to "DOWN" so that the corresponding front-end unit operates in an idle mode in which most of circuits are shut down and a low-rate clock is working to reduce power consumption. It is to be understood that, when any front-end unit is set to "OFF" or "DOWN", the corresponding transmission or reception capability is loss.

The control unit 110 may operate as a packet traffic arbitrator (PTA) to receive the traffic requests from both the WiFi module 120 and the BT module 130, and to determine whether the WiFi traffic request has collided with the BT traffic request in a time period. If a collision has occurred, the control unit 110 may grant both of the traffic requests or may only grant one of the traffic requests while rejecting the other, depending on the frequency bands, priorities, operation types (e.g. Tx/Rx operation), power levels or others parameters of the traffic requests. Additionally, the control unit 110 further controls the switch device 20 to connect the terminal 22 to the terminal 24 or 26, the balun-switch unit 162 to connect the terminal 162-2 to the terminal 162-4 or 162-6, and the balun-switch unit 163 to connect the terminal 163-2 to the terminal 163-4 or 163-6. It is to be understood that the control unit 110 may be integrated into the WiFi module 120 or the BT module 130 to reduce hardware costs.

Figure 5A:
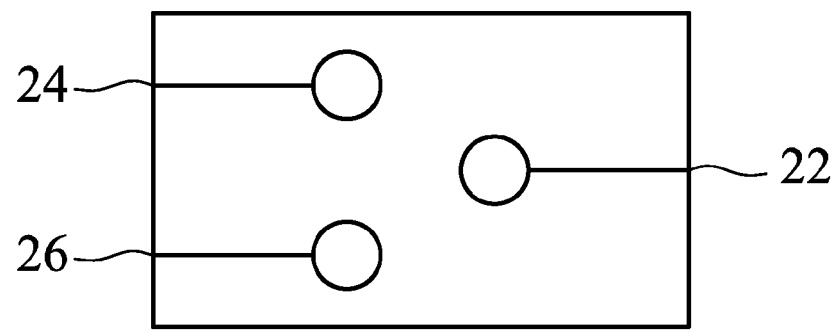
FIG. 5A shows a diagram illustrating a switching device implemented by a single-pole double-thrown (SPDT) switch in accordance with an embodiment of the invention.
Figure 5B:
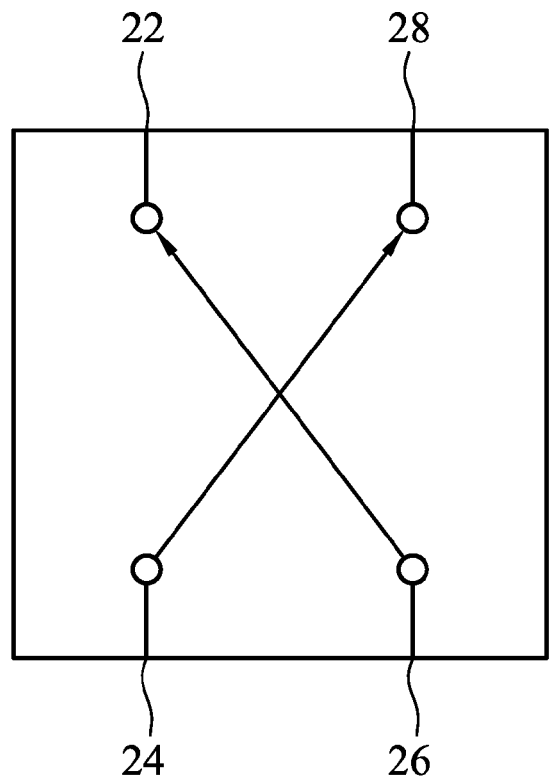
FIG. 5B shows a diagram illustrating a switching device implemented by a double-pole double-thrown (DPDT) switch in accordance with an embodiment of the invention.

The switching device 20 may be implemented by a single-pole double-thrown (SPDT) switch, which consists of three terminals 22, 24 and 26 and is configured to selectively connect the terminal 22 to the terminal 24 and 26, as shown in FIG. 5A. In addition, the terminals 24 and 26 are connected to the ports 1 and 2 of the wireless communications chipset 100, respectively. In other embodiments, the switching device 20 may also be implemented by a double-pole double-thrown (DPDT) as shown in FIG. 5B. The terminal 24 is selectively connected to the terminals 22 and 28, and the terminal 26 is selectively connected to the terminals 22 and 28. The terminal 28 may be coupled or connected to an external node for impedance matching.

Figure 6A:
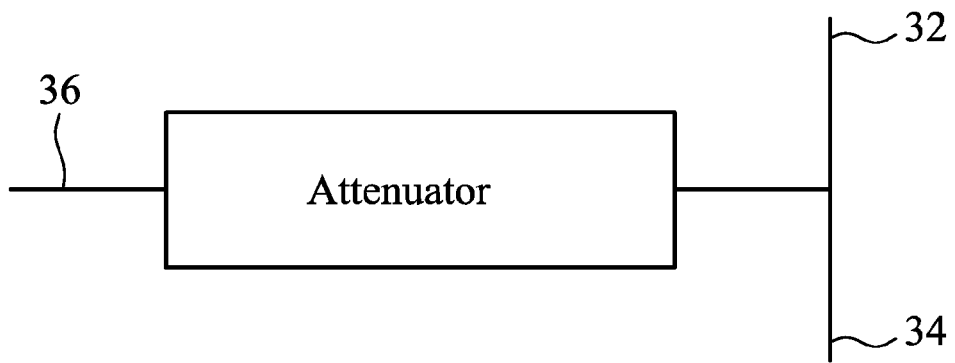
FIG. 6A shows a connection device implemented using an attenuator in accordance with an embodiment of the invention.
Figure 6B:
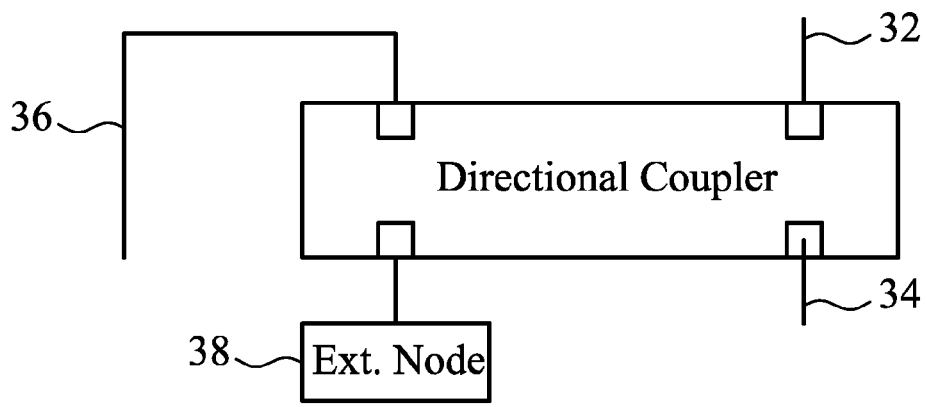
FIG. 6B shows a connection device implemented using a directional coupler in accordance with an embodiment of the invention.

The connection device 30 consists of three ports 32, 34 and 36 and is configured to couple the ports 32 and 34 to form a transceiving path (through path), and to couple the ports 32 and 36 to form another transceiving path (coupled path), wherein the port 34 is isolated from the port 36 by substantially 20 dB and the electrical signals passing through the path between ports 32 and 36 are substantially attenuated by 6 or 10 dB. Referring to FIG. 6A, the connection device 30 may contain an attenuator attenuating electrical signals passing through the ports 32 and 36 by 20 dB. Alternatively, the connection device 30 may contain a directional coupler, as shown in FIG. 6B, in which the ports 32 and 34 are coupled as a through path, the port 36 and an external node 38 are connected as a through path, the ports 32 and 36 are coupled as a coupled path, and the ports 34 and 36 are isolated with a loss around 20-40 dB. The through path is direct or indirect through and the external node may be a resistor (for example, a 50Ω resistor or a 50Ω equivalent termination). It is noted that the through path between the ports 32 and 34 may have a loss of 0.5 dB substantially while the coupled path between ports 32 and 36 may have a loss of 10 dB substantially, or the through path between ports 32 and 34 may have a loss of 1.2 dB substantially while the coupled path between ports 32 and 36 may have a loss of 6 dB substantially.

Figure 7A:
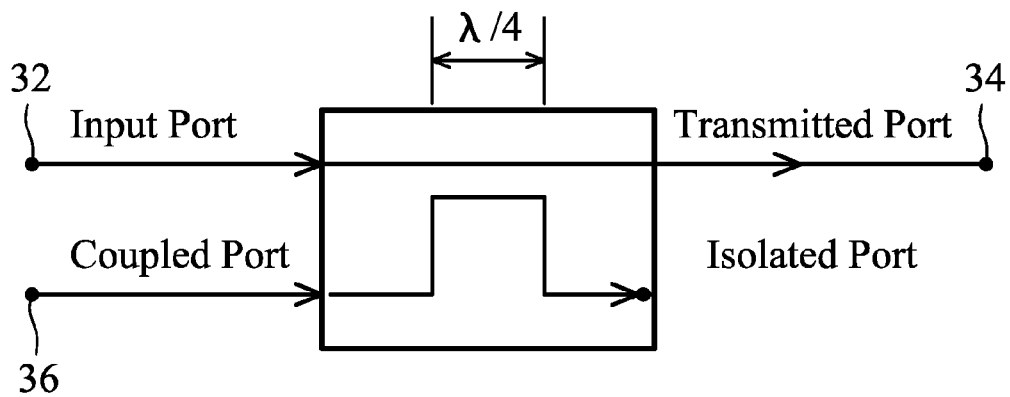
FIGS. 7A and 7B show the configurations of a connection device in accordance with an embodiment of the invention.
Figure 7B:
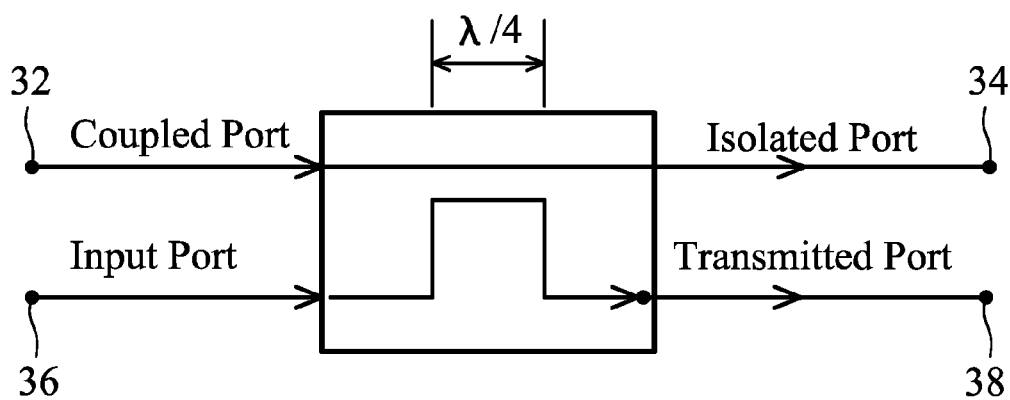
Figure 8A:
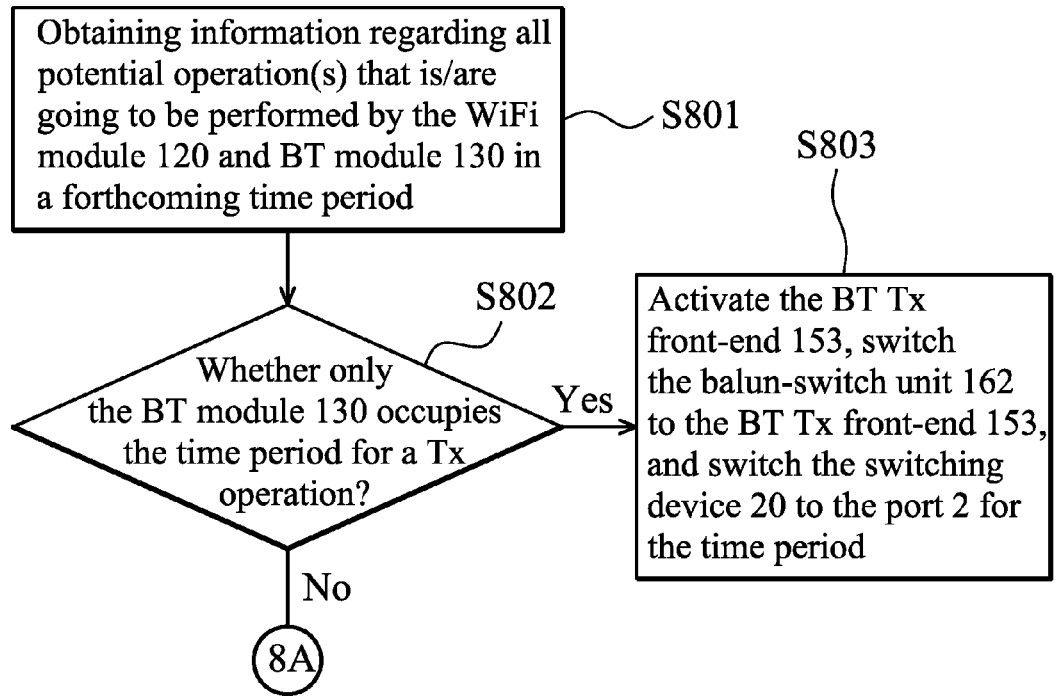
FIGS. 8A to 8G show a flowchart for handling the coexistence between WiFi and BT modules in accordance with an embodiment of the invention, based on the system of FIG. 4.
Figure 8A:
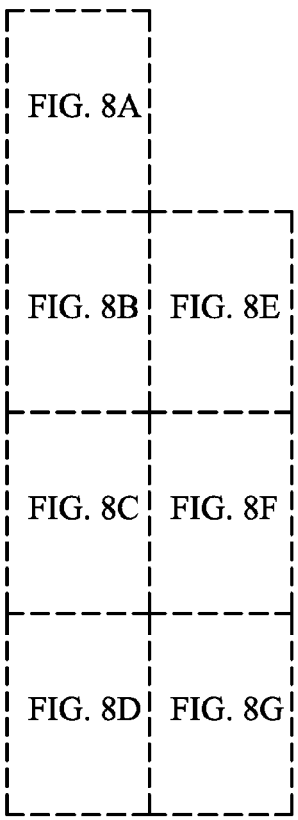
Figure 8B:
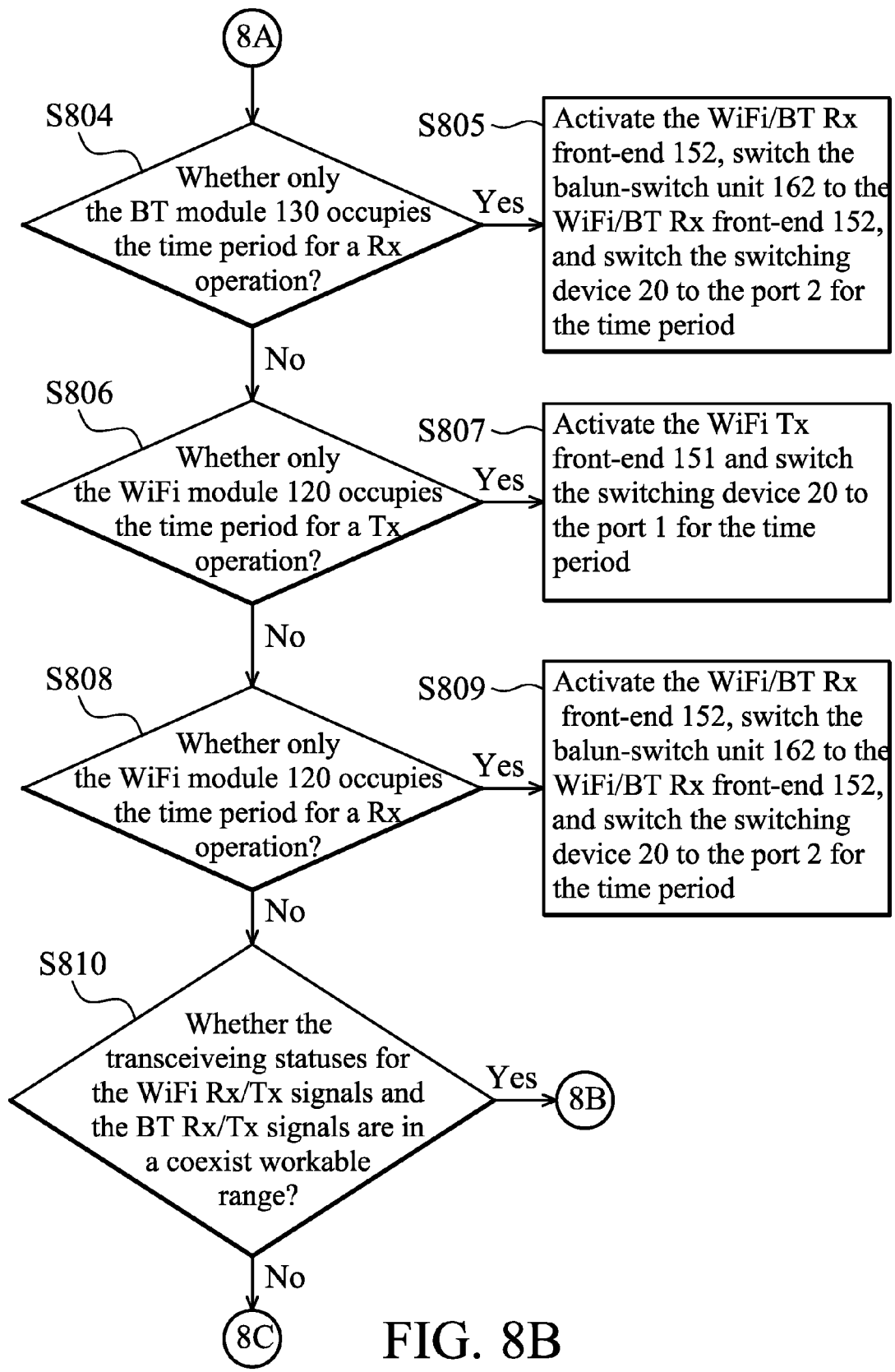
Figure 8C:
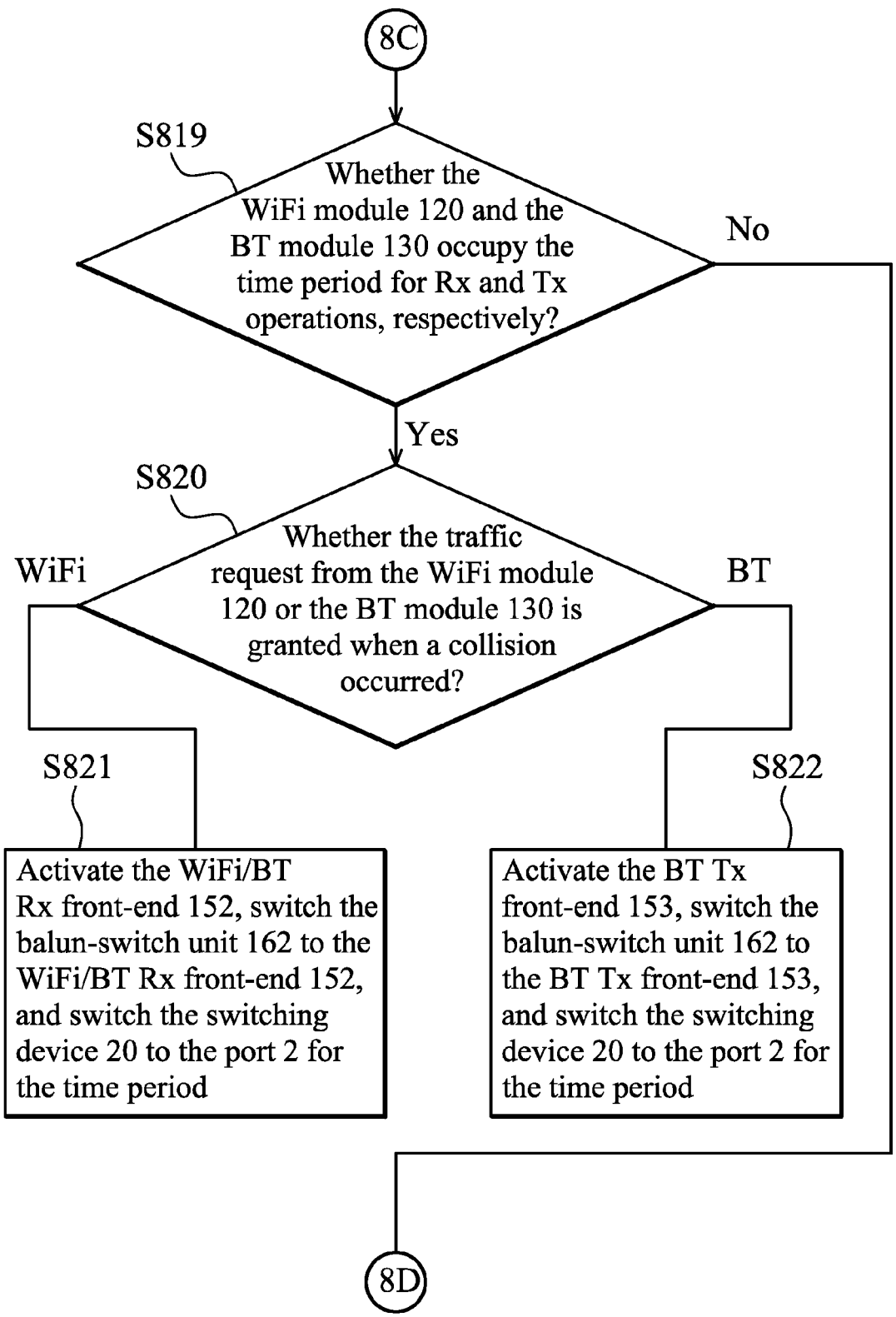
Figure 8D:
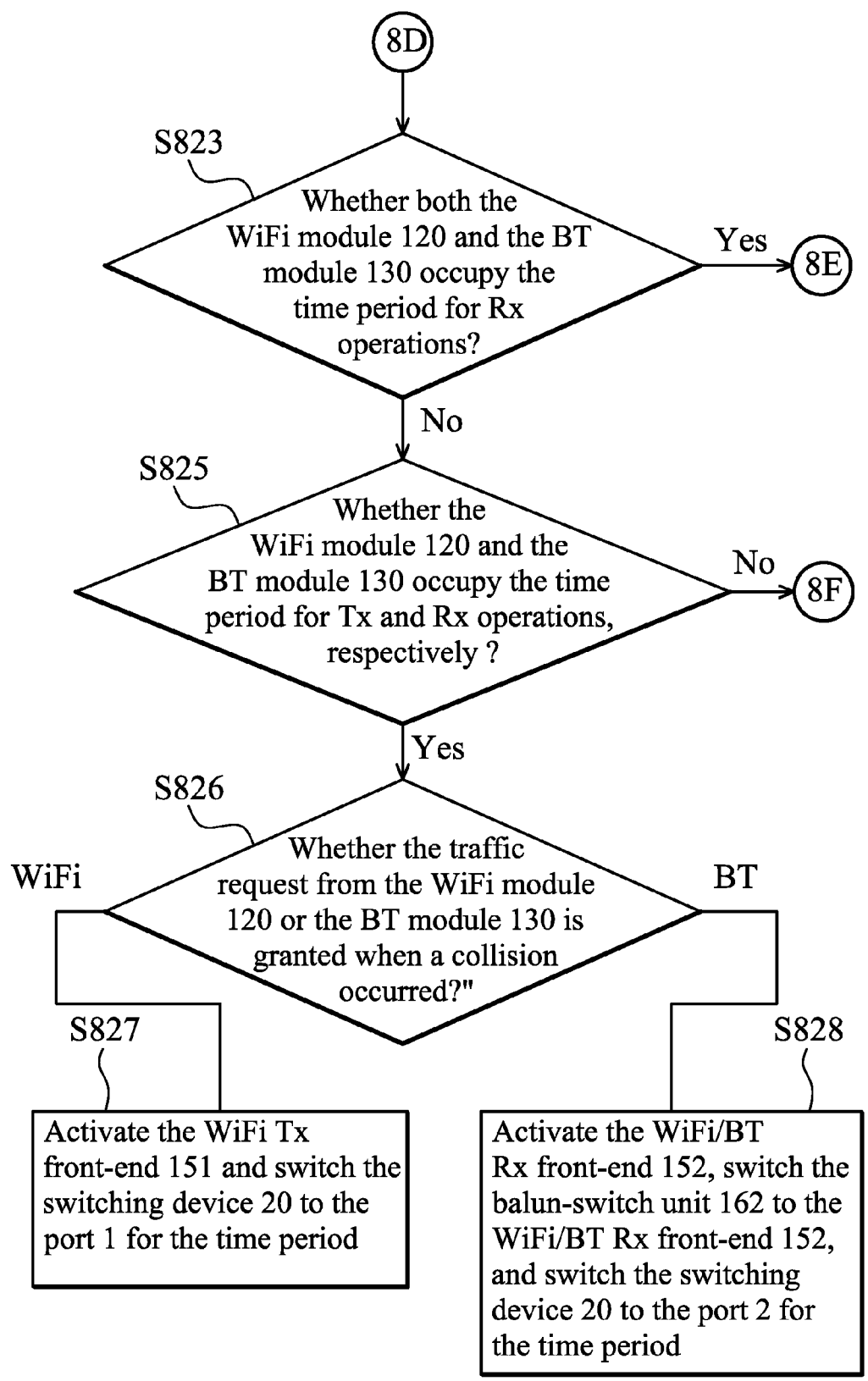
Figure 8E:
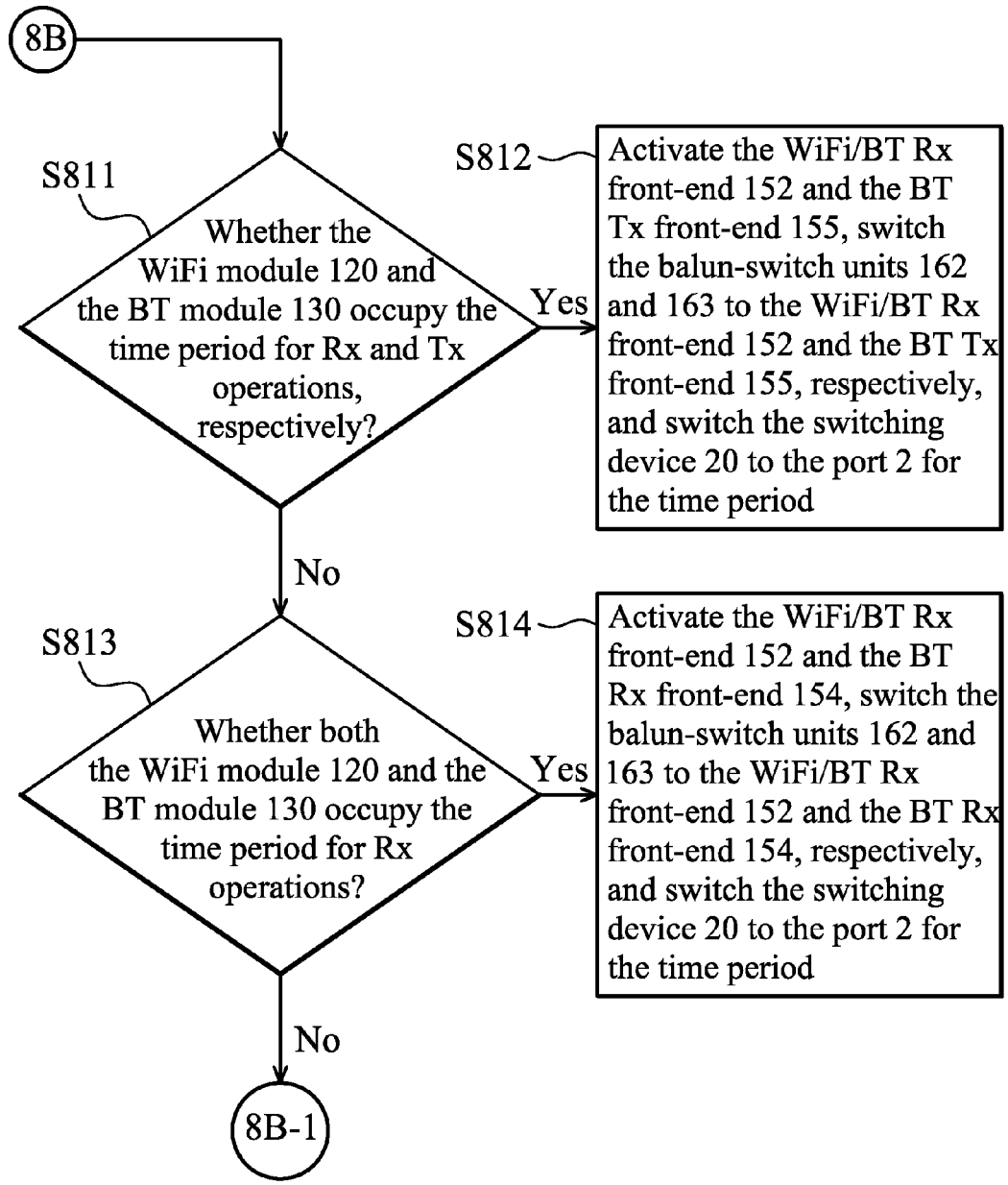
Figure 8F:
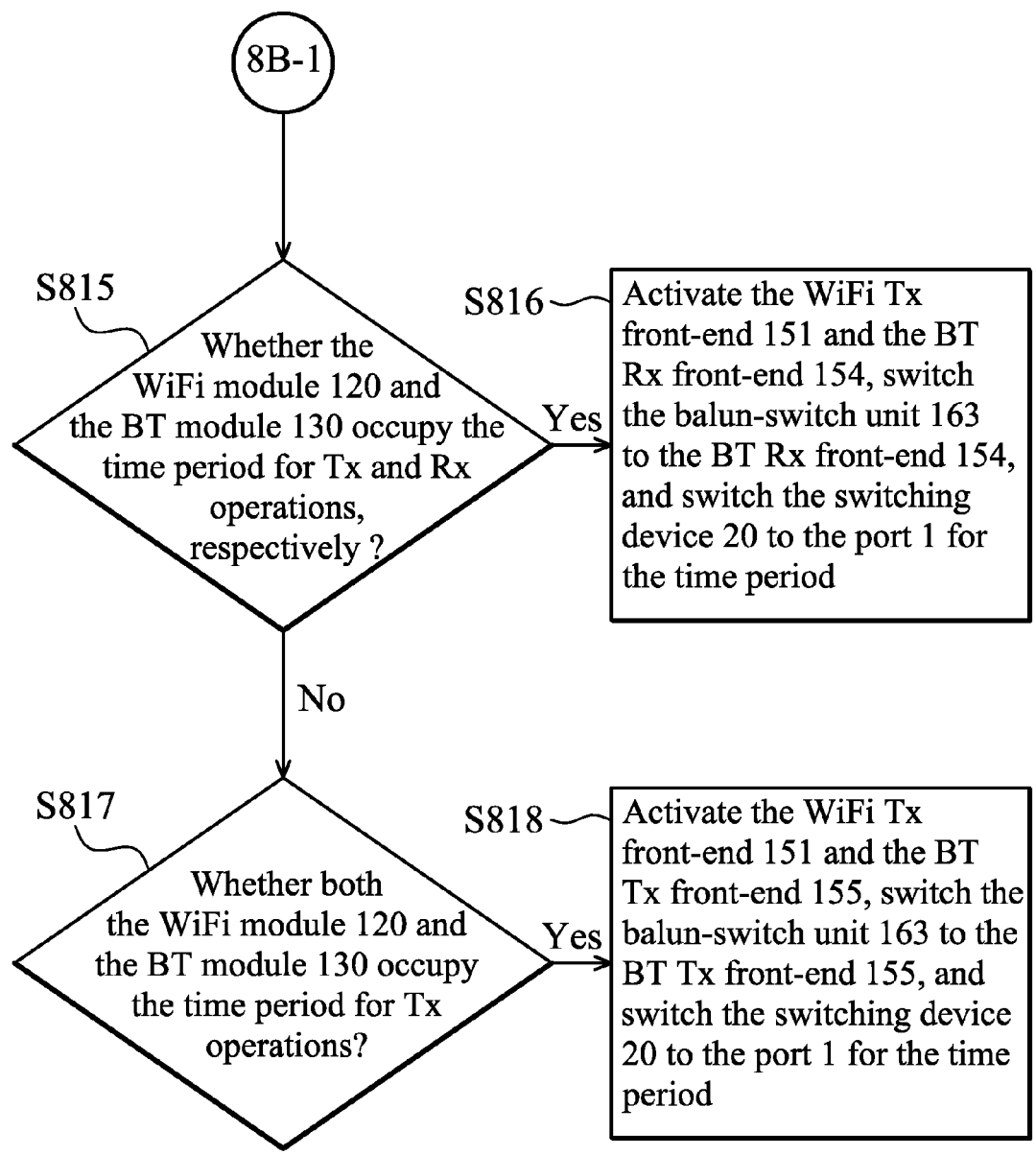
Figure 8G:
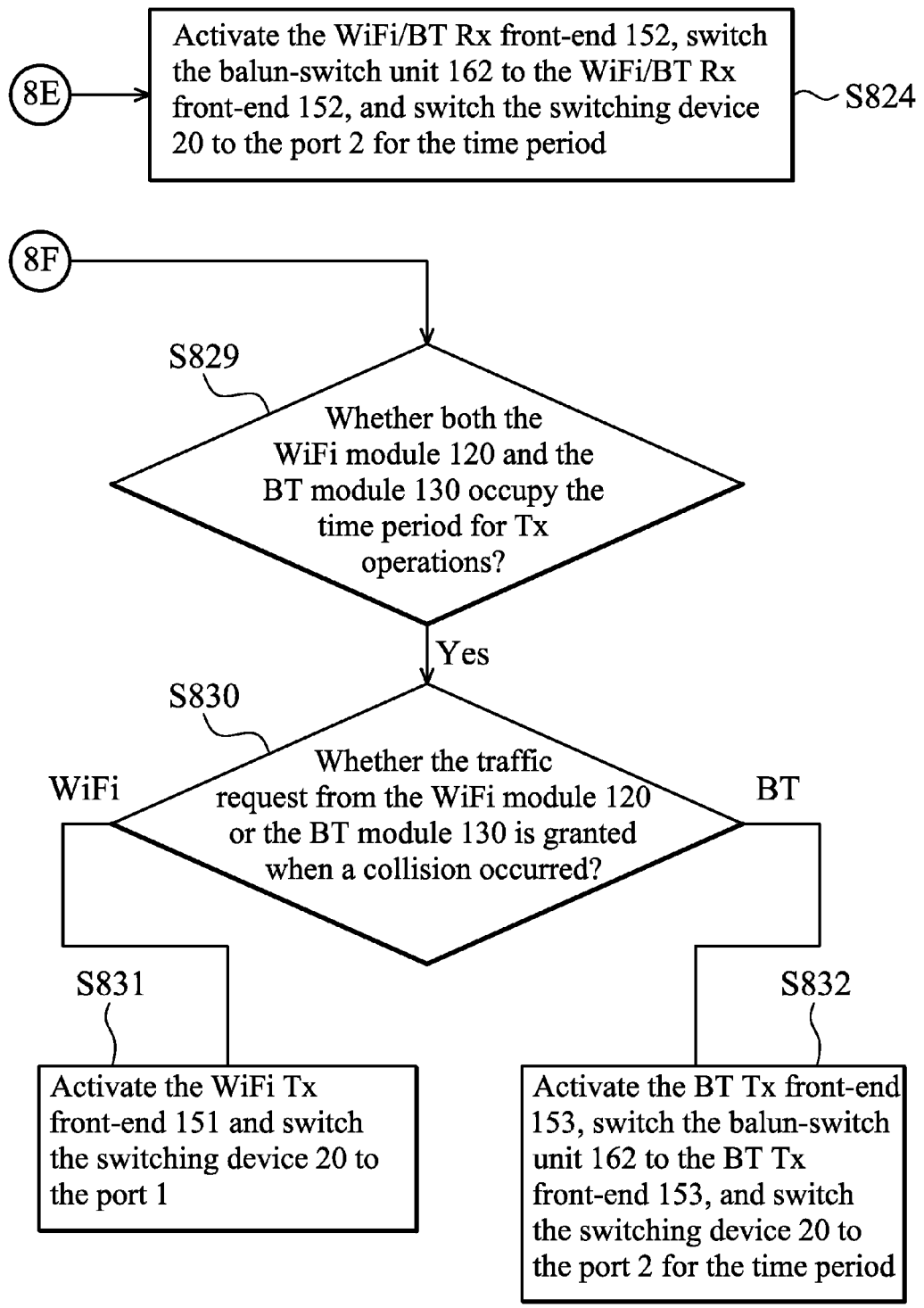

Referring to FIG. 7A, two transmission lines are set sufficiently close together, such that electrical signals (or energy) directed from the port 32 (connected to a port called an input port) to the port 34 (connected to a port called a transmitted port) is coupled to the port 36 (connected to a port called a coupled port). Similarly, referring to FIG. 7B, electrical signals (or energy) directed from the ports 36 (connected to a port called an input port) to a transmitted port (such as port 38 in FIG. 6B) is coupled to the port 32 (connected to a port called a coupled port) and isolated from the port 34 (connected to a port called an isolated port), such that the coupled signals can be added to electrical signals passing between the ports 32 and 34.

In addition to the attenuator (FIG. 6A) and the directional coupler (FIG. 6B), the connection device 30 may be implemented in a power divider, in which the ports 34 and 36 are isolated and both have a loss of 3 dB ideally (3.5 dB in practice). Furthermore, the connection device 30 may be implemented in a power splitter. The structure of the power splitter is similar to the power divider, but with different losses between the output ports. For a power splitter, the losses of the ports 34 and 36 are different. For example, the port 36 may have a loss of 10 dB while the port 34 may have a loss of 0.5 dB, or the port 36 may have a loss of 6 dB while the port 34 may have a loss of 1 dB. In addition, the connection device 30 may be implemented by a PCB pad with an input port and two output ports, in which one of the output ports has a loss of NdB and another output port has a loss of smaller than 1 dB, as designed based on requirement. It is noted that the power splitter may be implemented using a directional coupler, such as the one shown in FIG. 6B, with the port 38 connected to a resistor for impedance matching and ports 34 and 36 being isolated. With the power splitter implemented using a directional coupler as shown in FIG. 6B, the port 36 may have a loss of 10 dB while the port 34 may have a loss of 0.5 dB, or the port 36 may have a loss of 6 dB while the port 34 may have a loss of 1 dB.

For the components and connection configurations therebetween in the wireless communications chipset 100 described above, it is noted that the WiFi module 120 has one Tx front-end and one Rx front-end while the BT modules 130 has two Tx front-ends and two Rx front-ends. Table 1 below depicts a combination of potential operation types performed by the system 400 according to an embodiment of the invention:

TABLE 1

| Mode | WiFi_Tx | WiFi_Rx | BT_Tx | BT_Rx |
|---|---|---|---|---|
| Mode 1 | 0 | 0 | 1 (Port 2) | 0 |
| Mode 2 | 0 | 0 | 0 | 1 (Port 2) |
| Mode 3 | 1 (Port 1) | 0 | 0 | 0 |
| Mode 4 | 0 | 1 (Port 2) | 0 | 0 |
| Mode 5 | 0 | 1 (Port 2) | 1 (Port 3) | 0 |
| Mode 6 | 0 | 1 (Port 2) | 0 | 1 (Port 3) |
| Mode 7 | 1 (Port 1) | 0 | 0 | 1 (Port 3) |
| Mode 8 | 1 (Port 1) | 0 | 1 (Port 3) | 0 |
| Mode 9 | 0 | 1 (Port 2) | 1 (Port 2) | 0 |
| Mode 10 | 0 | 1 (Port 2) | 0 | 1 (Port 2) |
| Mode 11 | 1 (Port 1) | 0 | 0 | 1 (Port 2) |
| Mode 12 | 1 (Port 1) | 0 | 1 (Port 2) | 0 |

In Table 1 above, "1" means TRUE, representing activation of a corresponding operation, whereas "0" means FALSE, representing deactivation of a corresponding operation. The operation modes in Table 1 above will be explained in more details with references to the flowchart in FIG. 8 below.

FIGS. 8A to 8G show a flowchart of the coexistence between WiFi and BT modules handled by the control unit 110 in accordance with an embodiment of the invention. The procedure begins with obtaining information regarding potential operation(s) that is/are going to be performed by the WiFi module 120 and BT module 130 in a forthcoming time period (step S801). Next, a series of inspections with respect to the obtained information are accordingly performed to determine whether only one or both of the WiFi module 120 and BT module 130 occupy a time period, and whether the time period occupied for a Tx/Rx operation by one module collides with an Tx/Rx operation by the other module. Specifically, it is determined whether only the BT module 130 occupies the time period for a Tx operation (step S802). If so, the control unit 110 sends control signals to activate the BT Tx front-end 153, switch the balun-switch unit 162 to the BT Tx front-end 153, and switch the switching device 20 to the port 2 for the time period (mode 1) (step S803), thereby enabling the BT Tx signals to be transmitted from the BT module 130 via the BT Tx front-end 153, the port 2, and the through path between the ports 34 and 32 in sequence to the antenna 10. Subsequent to step S802, if not, it is determined whether only the BT module 112 occupies the time period for an Rx operation (step S804). If so, the control unit 110 sends control signals to activate the WiFi/BT Rx front-end 152, switch the balun-switch unit 162 to the WiFi/BT Rx front-end 152, and switch the switching device 20 to the port 2 for the time period (mode 2) (step S805), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S804, if not, it is determined whether only the WiFi module 120 occupies the time period for a Tx operation (step S806). If so, the control unit 110 sends control signals to activate the WiFi Tx front-end 151 and switch the switching device 20 to the port 1 for the time period (mode 3) (step S807), thereby enabling the WiFi Tx signals to be transmitted from the WiFi module 120 via the WiFi Tx front-end 151, the port 1, and the through path between the ports 34 and 32 in sequence to the antenna 10. Subsequent to step S806, if not, it is determined whether only the WiFi module 120 occupies the time period for an Rx operation (step S808). If so, the control unit 110 sends control signals to activate the WiFi/BT Rx front-end 152, switch the balun-switch unit 162 to the WiFi/BT Rx front-end 152, and switch the switching device 20 to the port 2 for the time period (mode 4) (step S809), thereby enabling the WiFi Rx signals to be received from the antenna 10 by the WiFi module 120 via the through path between the ports 32 and 34, the port 2, the WiFi/BT Rx front-end 152, and the separator 140 in sequence.

Figure 9A:
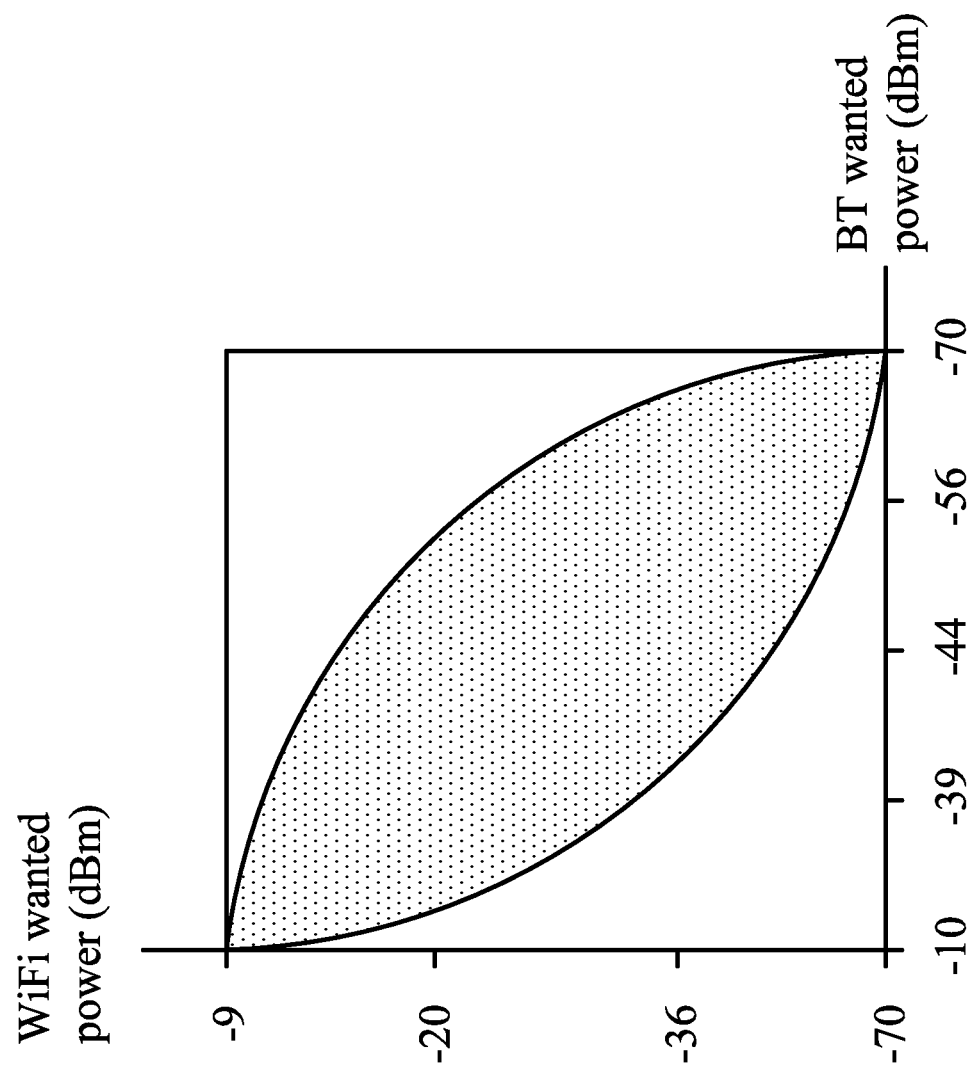
FIGS. 9A and 9B show exemplary coexistence operational ranges of the wanted powers of the WiFi Rx/Tx signals versus that of the BT Rx/Tx signals.
Figure 9B:
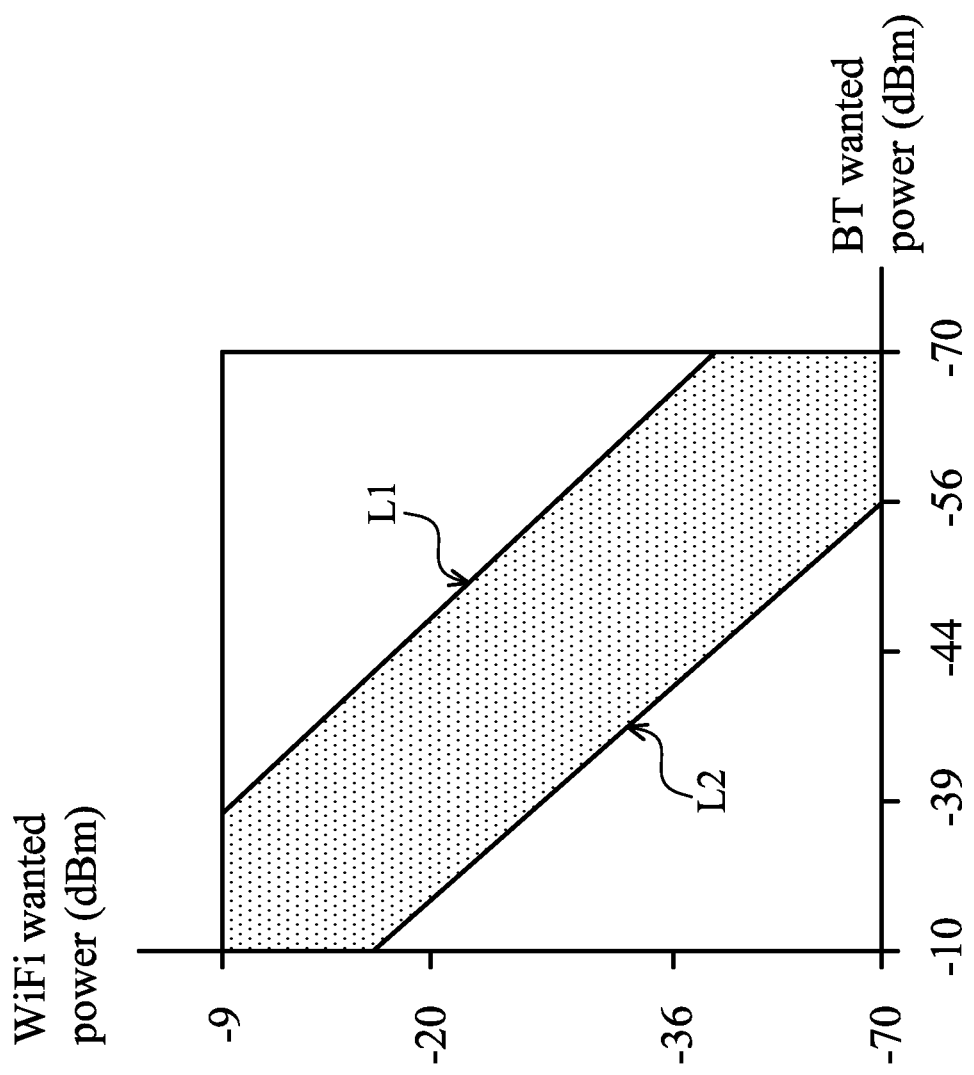

Subsequent to step S808, if not, it means that both the WiFi module 120 and the BT module 130 occupy the time period for their operations. However, it is noted that when a WiFi Rx/Tx operation and a BT Rx/Tx operation both take place at the same time, the WiFi Rx/Tx signals may interfere with the BT Rx/Tx signals, and vice versa. Consequently, the larger the wanted power of the WiFi Tx signals is, the greater the interferences are to the BT Rx/Tx signals, and vice versa. For this reason, it is determined whether transceiving statuses for the WiFi Rx/Tx signals and the BT Rx/Tx signals are in an operational range where coexistence is achievable (step S810). The transceiving status may be wanted power, received signal strength indication (RSSI), historical packet error rate (PER), historical bit error rate (BER), signal-to-noise ratio (SNR), or interference-to-signal ratio (ISR) of the WiFi Rx/Tx signals or the BT Rx/Tx signals. In addition, the transceiving status may be a certain number of reconnections for historical WiFi Rx/Tx operations or the BT Rx/Tx operations. FIG. 9A is a diagram illustrating an exemplary coexistence operational range of wanted powers of WiFi Rx/Tx signals versus that of BT Rx/Tx signals. The gray area defines operational range where coexistence is achievable in which the WiFi Rx/Tx operation and the BT Rx/Tx operation are simultaneously performed. The size of coexistence operational range may depend on the anti-interference ability of the WiFi module 120 and the BT module 130. The white areas define the standalone operational ranges in which only one of the WiFi Rx/Tx operation and the BT Rx/Tx operation is performed at the same time. FIG. 9B is a diagram illustrating another exemplary coexistence operational range of wanted powers of WiFi Rx/Tx signals versus that of BT Rx/Tx signals. The line L1 represents the boundary for the anti-interference ability of the BT module 130. In one embodiment, the boundary for the anti-interference ability of the BT module 130 may be defined by setting the value of the ISR to 25 dB. Similarly, the line L2 represents the boundary for the anti-interference ability of the WiFi module 120 and can be determined by setting the ISR to a specific value. The gray area between the lines L1 and L2 defines the coexistence operational range where coexistence is achievable, and the white areas define the standalone operational ranges in which only one of the WiFi Rx/Tx operation and the BT Rx/Tx operation is performed at the same time. In addition to the diagrams shown in FIGS. 9A and 9B, whether the transceiving statuses for the WiFi Rx/Tx signals and the BT Rx/Tx signals are in a coexistence operational range may be determined according to a mapping table which specifies the values of the transceiving statuses corresponding to the coexistence operational range and the standalone operational ranges.

Subsequent to step S810, if so, it is determined whether the WiFi module 120 and the BT module 130 occupy the time period for Rx and Tx operations, respectively (step S811). If so, the control unit 110 sends control signals to activate the WiFi/BT Rx front-end 152 and the BT Tx front-end 155, switch the balun-switch units 162 and 163 to the WiFi/BT Rx front-end 152 and the BT Tx front-end 155, respectively, and switch the switching device 20 to the port 2 for the time period (mode 5) (step S812), thereby enabling the WiFi Rx signals to be received from the antenna 10 by the WiFi module 120 via the through path between the ports 32 and 34, the port 2, the WiFi/BT Rx front-end 152, and the separator 140 in sequence, along with the BT Tx signals to be transmitted from the BT module 130 via the BT Tx front-end 155, the port 3, and the coupled path between the ports 32 and 36 in sequence to the antenna 10. Subsequent to step S811, if not, it is determined whether both the WiFi module 120 and the BT module 130 occupy the time period for Rx operations (step S813). If so, the control unit 110 sends control signals to activate the WiFi/BT Rx front-end 152 and the BT Rx front-end 154, switch the balun-switch units 162 and 163 to the WiFi/BT Rx front-end 152 and the BT Rx front-end 154, respectively, and switch the switching device 20 to the port 2 for the time period (mode 6) (step S814), thereby enabling the WiFi Rx signals to be received from the antenna 10 by the WiFi module 120 via the through path between the ports 32 and 34, the port 2, the WiFi/BT Rx front-end 152, and the separator 140 in sequence, along with the BT Rx signals to be received from the antenna 10 by the BT module 130 via the coupled path between the ports 32 and 36, the port 3, and the BT Rx front-end 154 in sequence. Subsequent to step S813, if not, it is determined whether the WiFi module 120 and the BT module 130 occupy the time period for Tx and Rx operations, respectively (step S815). If so, the control unit 110 sends control signals to activate the WiFi Tx front-end 151 and the BT Rx front-end 154, switch the balun-switch unit 163 to the BT Rx front-end 154, and switch the switching device 20 to the port 1 for the time period (mode 7) (step S816), thereby enabling the WiFi Tx signals to be transmitted from the WiFi module 120 via the WiFi Tx front-end 151, the balun unit 161, the port 1, and the through path between the ports 32 and 34 in sequence to the antenna 10, along with the BT Rx signals to be received from the antenna 10 by the BT module 130 via the coupled path between the ports 32 and 36, the port 3, and the BT Rx front-end 154 in sequence. Subsequent to step S815, if not, it is determined whether both the WiFi module 120 and the BT module 130 occupy the time period for Tx operations (step S817). If so, the control unit 110 sends control signals to activate the WiFi Tx front-end 151 and the BT Tx front-end 155, switch the balun-switch unit 163 to the BT Tx front-end 155, and switch the switching device 20 to the port 1 for the time period (mode 8) (step S818), thereby enabling the WiFi Tx signals to be transmitted from the WiFi module 120 via the WiFi Tx front-end 151, the balun unit 161, the port 1, and the through path between the ports 32 and 34 in sequence to the antenna 10, along with the BT Tx signals to be transmitted from the BT module 130 via the BT Tx front-end 155, the port 3, and the coupled path between the ports 32 and 36 in sequence to the antenna 10.

Subsequent to step S810, if not, it is determined whether the WiFi module 120 and the BT module 130 occupy the time period for Rx and Tx operations, respectively (step S819). If so, the control unit 110 determines whether a collision has occurred in the traffic requests from the WiFi module 120 and the BT module 130, and arbitrates which traffic request is to be granted when a collision has occurred (step S820). If the granted traffic request is from the WiFi module 120, the control unit 110 sends control signals to activate the WiFi/BT Rx front-end 152, switch the balun-switch unit 162 to the WiFi/BT Rx front-end 152, and switch the switching device 20 to the port 2 for the time period (mode 9) (step S821), thereby enabling the WiFi Rx signals to be received from the antenna 10 by the WiFi module 120 via the through path between the ports 32 and 34, the port 2, the WiFi/BT Rx front-end 152, and the separator 140 in sequence. If the granted traffic request is from the BT module 130, the control unit 110 sends control signals to activate the BT Tx front-end 153, switch the balun-switch unit 162 to the BT Tx front-end 153, and switch the switching device 20 to the port 2 for the time period (mode 9) (step S822), thereby enabling the BT Tx signals to be transmitted from the BT module 130 via the BT Tx front-end 153, the balun-switch unit 162, the port 2, and the through path between the ports 32 and 34 in sequence to the antenna 10. Subsequent to step S819, if not, it is determined whether both the WiFi module 120 and the BT module 130 occupy the time period for Rx operations (step S823). If so, the control unit sends control signals to activate the WiFi/BT Rx front-end 152, switch the balun-switch unit 162 to the WiFi/BT Rx front-end 152, and switch the switching device 20 to the port 2 for the time period (mode 10) (step S824), thereby enabling a combined signal to be received from the antenna 10 by the separator 140 via the through path between ports 32 and 34, the port 2, and the WiFi/BT Rx front-end 152 in sequence. Thereafter, the separator 140 separates them into the WiFi and BT Rx signals and further forwarded to the WiFi module 120 and BT module 130, respectively. Subsequent to step S823, if not, it is determined whether the WiFi module 120 and the BT module 130 occupy the time period for Tx and Rx operations, respectively (step S825). If so, the control unit 110 determines whether a collision has occurred in the traffic requests from the WiFi module 120 and the BT module 130, and arbitrates which traffic request is to be granted when a collision has occurred (step S826). If the granted traffic request is from the WiFi module 120, the control unit 110 sends control signals to activate the WiFi Tx front-end 151 and switch the switching device 20 to the port 1 for the time period (mode 11) (step S827), thereby enabling the WiFi Tx signals to be transmitted from the WiFi module 120 via the WiFi Tx front-end 151, the balun unit 161, the port 1, and the through path between the ports 32 and 34 in sequence to the antenna 10. If the granted traffic request is from the BT module 130, the control unit 110 sends control signals to activate the WiFi/BT Rx front-end 152, switch the balun-switch unit 162 to the WiFi/BT Rx front-end 152, and switch the switching device 20 to the port 2 for the time period (mode 11) (step S828), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S825, if not, it is determined whether both the WiFi module 120 and the BT module 130 occupy the time period for Tx operations (step S829). If so, the control unit 110 determines whether a collision has occurred in the traffic requests from the WiFi module 120 and the BT module 130, and arbitrates which traffic request is to be granted when a collision has occurred (step S830). If the granted traffic request is from the WiFi module 120, the control unit 110 sends control signals to activate the WiFi Tx front-end 151 and switch the switching device 20 to the port 1 (mode 12) (step S831), thereby enabling the WiFi Tx signals to be transmitted from the WiFi module 120 via the WiFi Tx front-end 151, the balun unit 161, the port 1, and the through path between the ports 32 and 34 in sequence to the antenna 10. If the granted traffic request is from the BT module 130, the control unit 110 sends control signals to activate the BT Tx front-end 153, switch the balun-switch unit 162 to the BT Tx front-end 153, and switch the switching device 20 to the port 2 for the time period (mode 12) (step S832), thereby enabling the BT Tx signals to be transmitted from the BT module 130 via the BT Tx front-end 153, the port 2, and the through path between the ports 32 and 34 in sequence to the antenna 10.

Those skilled in the art may readily modify the hardware structure of the system 400 by implementing the connection device 30 in a 3-port power splitter having an input port 32 and two output ports 34 and 36. The first path between the input port 32 and the output port 34 has a first path loss, and the second path between the input port 32 and the output port 36 has a second path loss. For a power splitter with equal loss, the path loss of the first and second paths is the same, while it is different for an unequal-loss power splitter. For the coupling values for the power splitter, reference may be made to Table 2 below:

TABLE 2

| Coupling Value For Through Path | Power Ratio (%) |
|---|---|
| 3 dB | 50/50 |
| 6 dB | 75/25 |
| 8 dB | 85/15 |
| 10 dB | 90/10 |
| 15 dB | 97/3 |
| 20 dB | 99/1 |

Taking the coupling value of 3 dB (3 dB directional coupler) for example, the through path has a path loss of 3 dB substantially, whereas the coupled path also has a path loss of 3 dB substantially. For the 6 dB directional coupler, the through path has a path loss of 1 dB substantially, whereas the coupled path also has a path loss of 6 dB substantially. For the 10 dB directional coupler, the through path has a path loss of 0.5 dB substantially, whereas the coupled path also has a path loss of 10 dB substantially.

Figure 10:
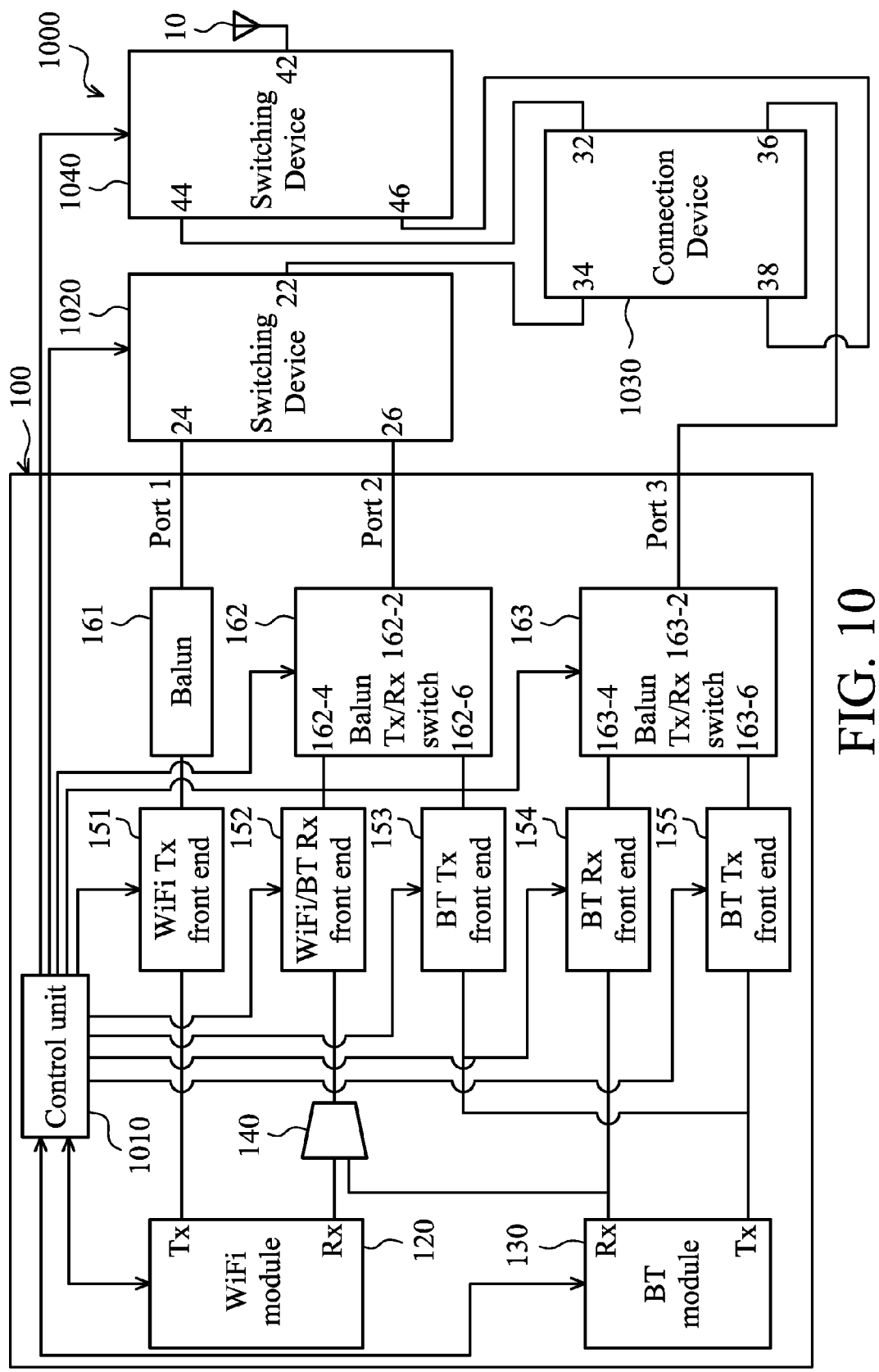
FIG. 10 shows a diagram illustrating a system for the coexistence between two wireless communications modules sharing single antenna according to another embodiment of the invention.
Figure 11A:
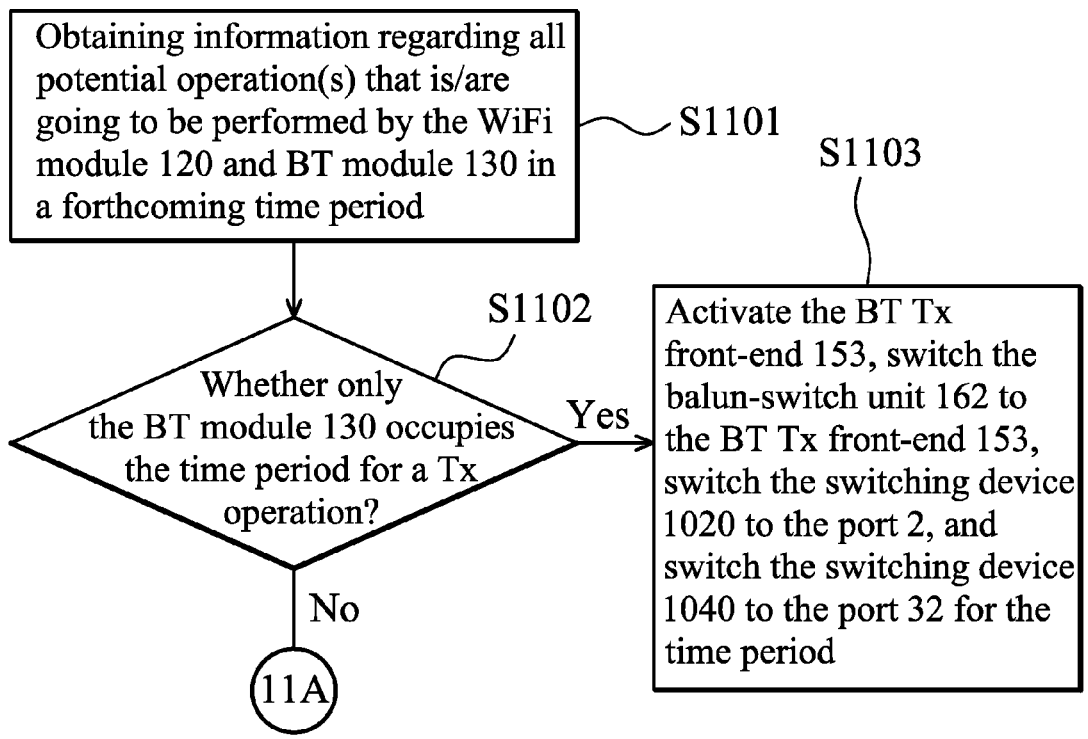
FIGS. 11A to 11G show a flowchart for handling coexistence between WiFi and Bluetooth modules according to an embodiment of the invention, based on the system of FIG. 10.
Figure 11A:
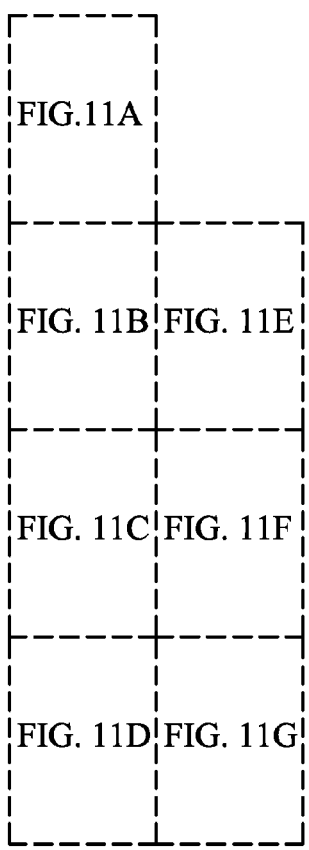
Figure 11B:
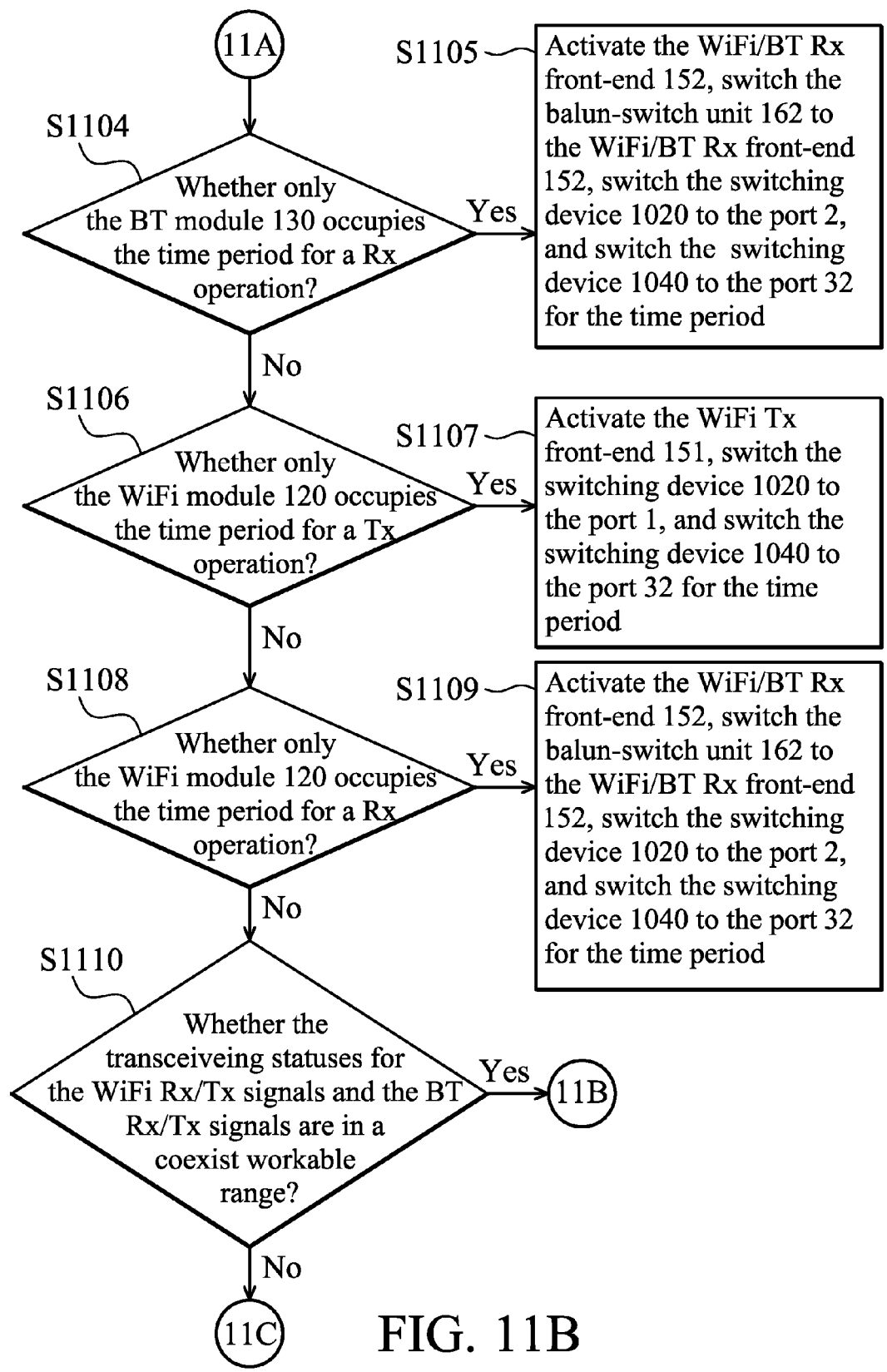
Figure 11C:
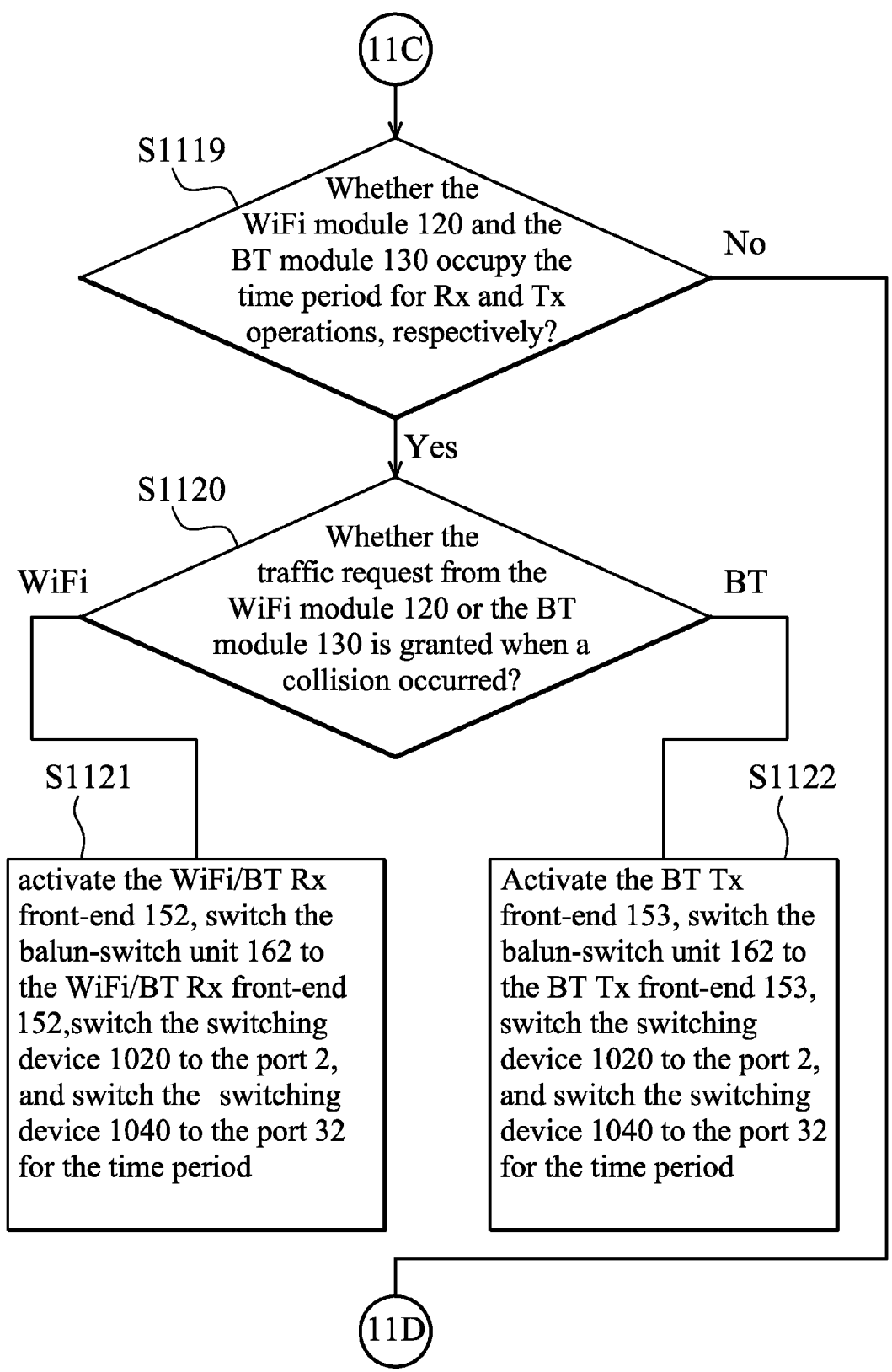
Figure 11D:
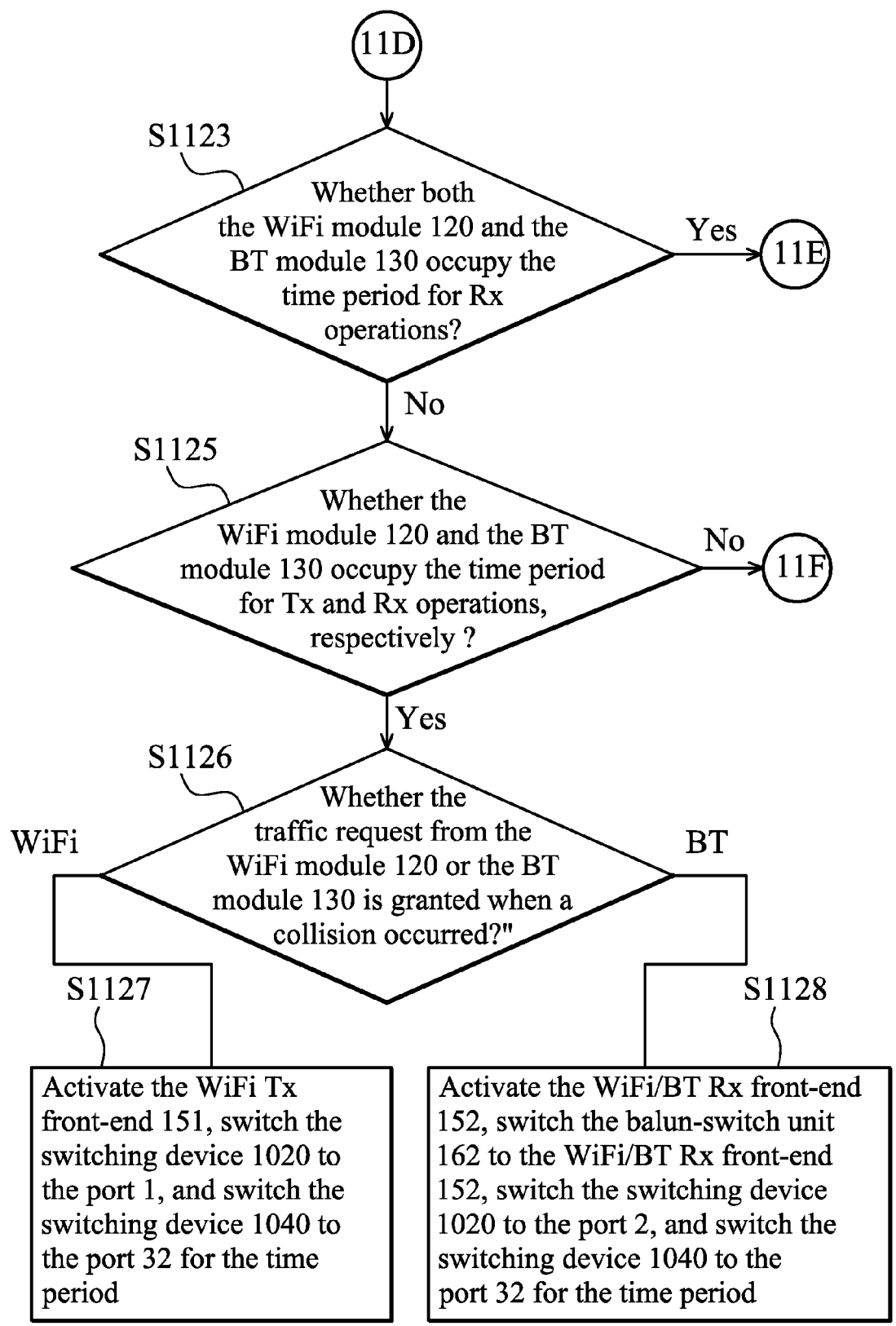
Figure 11E:
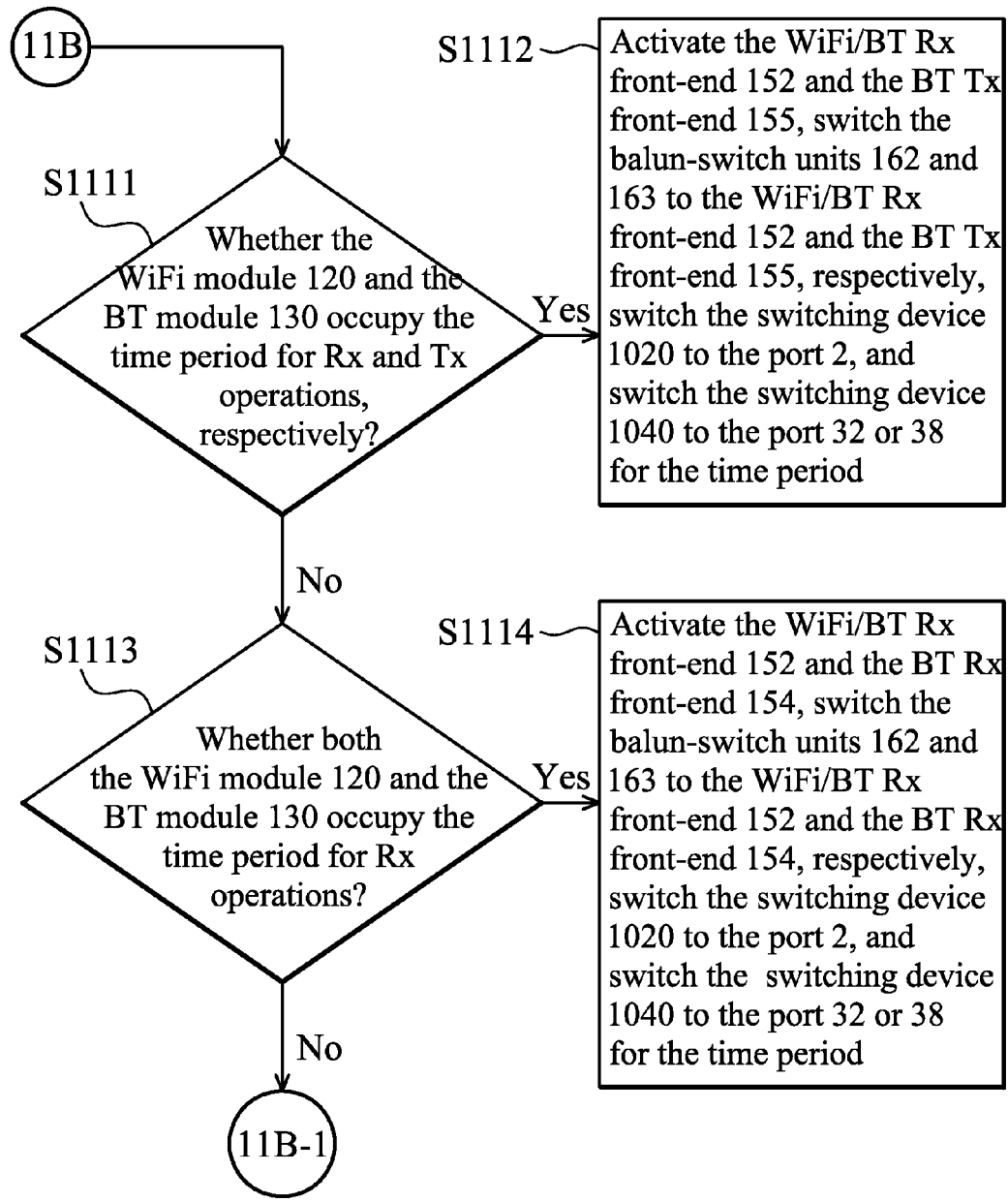
Figure 11F:
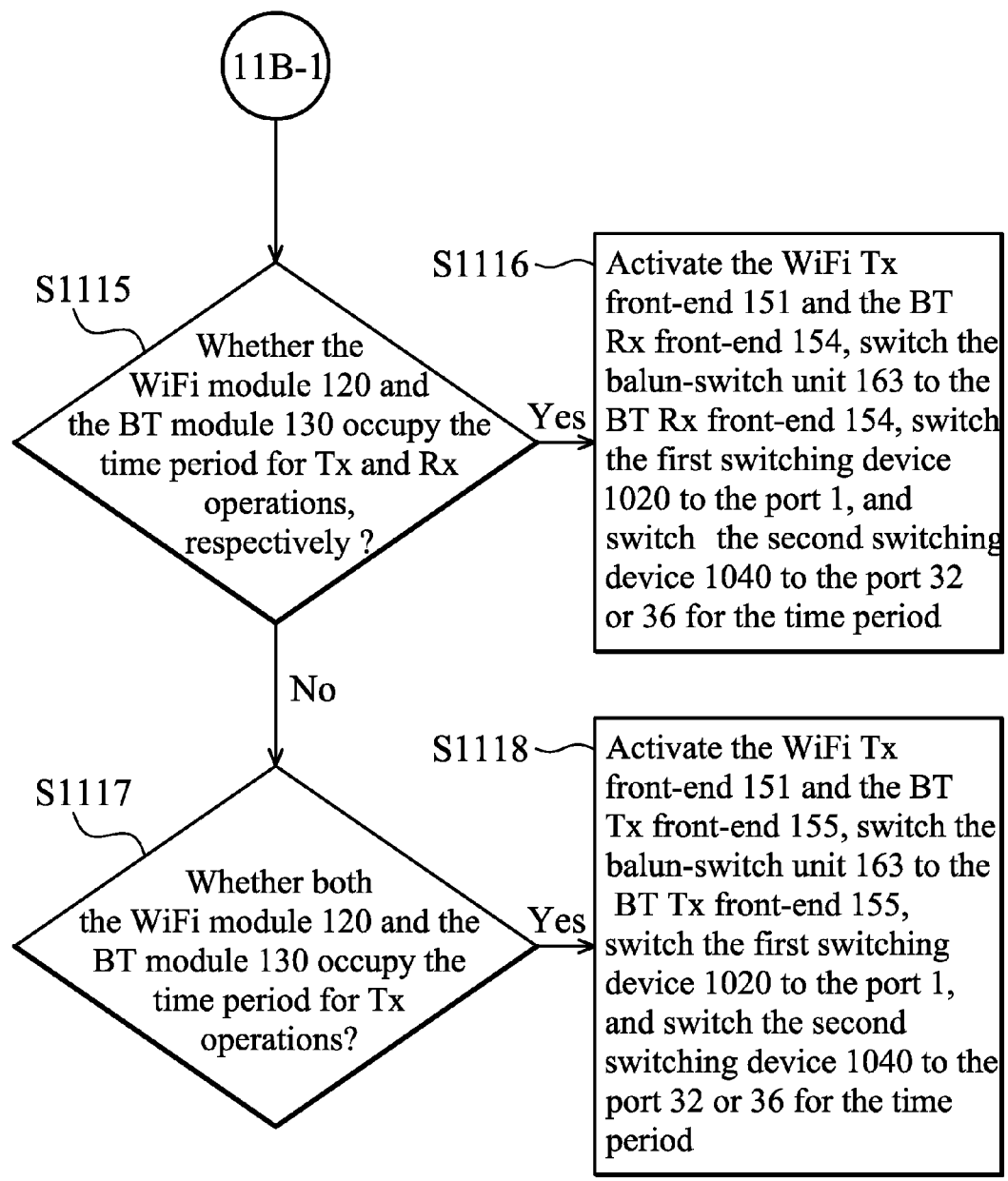
Figure 11G:
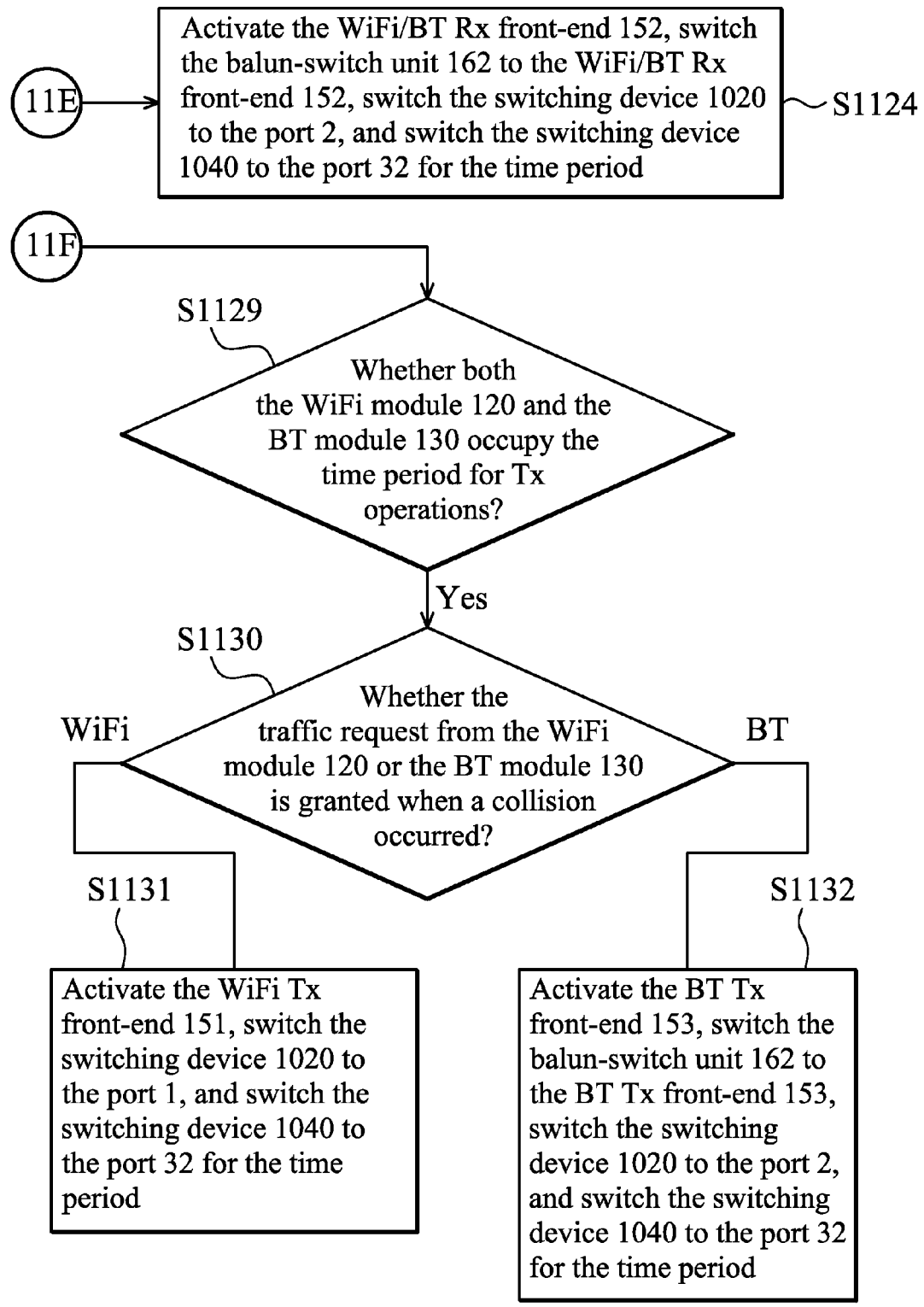

In another embodiment of the invention, an additional switch device may be included in the system 400, as shown in FIG. 10. Similar to the system 400 in FIG. 4, the system 1000 herein also comprises the antenna 10 and the wireless communications chipset 100. Regarding descriptions of the antenna 10 and the elements in the wireless communications chipset 100 excluding the control unit 110, reference may be made to FIG. 4. However, the elements between the antenna 10 and the wireless communications chipset 100 in the system 1000 are different from those in the system 400. A switching device 1020, similar to the switching device 20, is configured to selectively connect the terminal 22 to the terminal 24 and 26 as controlled by the control unit 1010, wherein the terminal 24 is connected to the port 1, the terminal 26 is connected to the port 2, and the terminal 22 is connected to the port 34 of a connection device 1030. The switching device 1020 may be implemented by an SPDT switch. The connection device 1030 is similar to the connection device 30, in which the ports 32 and 34 are connected via a first through path, the ports 36 and 38 are connected via a second through path, the ports 32 and 36 are coupled via a first coupled path, the ports 34 and 38 are coupled via a second coupled path, the ports 34 and 36 are isolated, and the ports 32 and 38 are isolated, wherein the first and second through paths are direct or indirect through. In addition, the ports 32 and 38 are connected to the terminals 44 and 46 of a switching device 1040, respectively, and the port 36 is connected to the port 3. The switching device 1040 is similar to the switching device 1020, which consists of three terminals 42, 44, and 46, and is configured to selectively connect the terminal 42 to the terminal 44 and 46 as controlled by the control unit 1010, wherein the terminal 42 is connected to the antenna 10. The switching devices 1020 and 1040, and the connection device 1030 may be integrated as a path selection circuit and disposed on a PCB. Note the first and second through paths may have a loss of 0.5 dB substantially, whereas the first and second coupled paths may have a loss of 10 dB substantially, or the first and second through paths may have a loss of 1 dB substantially, whereas the first and second coupled paths may have a loss of 6 dB substantially.

In the following discussion, reference may be made to Table 1 and related descriptions. In response to the modification of the path selection circuit, the control unit 1010 performs similar but different function than that of FIG. 4. FIGS. 11A to 11G show a flowchart of the coexistence between WiFi and BT modules handled by the control unit 1010 in accordance with an embodiment of the invention. The procedure begins with obtaining information regarding potential operation(s) that is/are going to be performed by the WiFi module 120 and BT module 130 in a forthcoming time period (step S1101). Next, a series of inspections with respect to the obtained information are accordingly performed to determine whether only one or both of the WiFi module 120 and BT module 130 occupy the time period, and whether the time period is occupied for a Tx/Rx operation by one module collides with an Tx/Rx operation by the other module. Specifically, it is determined whether only the BT module 130 occupies the time period for a Tx operation (step S1102). If so, the control unit 1010 sends control signals to activate the BT Tx front-end 153, switch the balun-switch unit 162 to the BT Tx front-end 153, switch the switching device 1020 to the port 2, and switch the switching device 1040 to the port 32 for the time period (mode 1) (step S1103), thereby enabling the BT Tx signals to be transmitted from the BT module 130 via the BT Tx front-end 153, the port 2, and the through path between the ports 34 and 32 in sequence to the antenna 10. Subsequent to step S1102, if not, it is determined whether only the BT module 130 occupies the time period for an Rx operation (step S1104). If so, the control unit 1010 sends control signals to activate the WiFi/BT Rx front-end 152, switch the balun-switch unit 162 to the WiFi/BT Rx front-end 152, switch the switching device 1020 to the port 2, and switch the switching device 1040 to the port 32 for the time period (mode 2) (step S1105), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S1104, if not, it is determined whether only the WiFi module 120 occupies the time period for a Tx operation (step S1106). If so, the control unit 1010 sends control signals to activate the WiFi Tx front-end 151, switch the switching device 1020 to the port 1, and switch the switching device 1040 to the port 32 for the time period (mode 3) (step S1107), thereby enabling the WiFi Tx signals to be transmitted from the WiFi module 120 via the WiFi Tx front-end 151, the port 1, and the through path between the ports 34 and 32 in sequence to the antenna 10. Subsequent to step S1106, if not, it is determined whether only the WiFi module 120 occupies the time period for an Rx operation (step S1108). If so, the control unit 1010 sends control signals to activate the WiFi/BT Rx front-end 152, switch the balun-switch unit 162 to the WiFi/BT Rx front-end 152, switch the switching device 1020 to the port 2, and switch the switching device 1040 to the port 32 for the time period (mode 4) (step S1109), thereby enabling the WiFi Rx signals to be received from the antenna 10 by the WiFi module 120 via the through path between the ports 32 and 34, the port 2, the WiFi/BT Rx front-end 152, and the separator 140 in sequence.

Subsequent to step S1108, if not, it means that both the WiFi module 120 and the BT module 130 occupy the time period for their operations. Since the WiFi Rx/Tx signals may interfere with the BT Rx/Tx signals, and vice versa, it is determined whether the transceiving statuses for the WiFi Rx/Tx signals and the BT Rx/Tx signals are in an operational range where coexistence is achievable (step S1110). The transceiving status may be the wanted power, RSSI, historical PER, historical BER, SNR, or ISR of the WiFi Rx/Tx signals or the BT Rx/Tx signals. In addition, the transceiving status may be a certain number of reconnections for historical WiFi Rx/Tx operations or the BT Rx/Tx operations. Regarding details of the coexistence operational range, reference may be made to FIGS. 9A and 9B and related descriptions. Subsequent to step S1110, if so, it is determined whether the WiFi module 120 and the BT module 130 occupy the time period for Rx and Tx operations, respectively (step S1111). If so, the control unit 1010 sends control signals to activate the WiFi/BT Rx front-end 152 and the BT Tx front-end 155, switch the balun-switch units 162 and 163 to the WiFi/BT Rx front-end 152 and the BT Tx front-end 155, respectively, switch the switching device 1020 to the port 2, and switch the switching device 1040 to the port 32 or 38 for the time period (mode 5) (step S1112), thereby enabling the WiFi Rx signals to be received from the antenna 10 by the WiFi module via the through path between the ports 32 and 34, the port 2, the WiFi/BT Rx front-end 152, and the separator 140 in sequence, along with the BT Tx signals to be transmitted from the BT module 130 via the BT Tx front-end 155, the port 3, and the through path between the ports 36 and 38 in sequence to the antenna 10. Subsequent to step S1111, if not, it is determined whether both the WiFi module 120 and the BT module 130 occupy the time period for Rx operations (step S1113). If so, the control unit 1010 sends control signals to activate the WiFi/BT Rx front-end 152 and the BT Rx front-end 154, switch the balun-switch units 162 and 163 to the WiFi/BT Rx front-end 152 and the BT Rx front-end 154, respectively, switch the switching device 1020 to the port 2, and switch the switching device 1040 to the port 32 or 38 for the time period (mode 6) (step S1114), thereby enabling the WiFi Rx signals to be received from the antenna 10 by the WiFi module 120 via the through path between the ports 32 and 34, the port 2, the WiFi/BT Rx front-end 152, and the separator 140 in sequence, along with the BT Rx signals to be received from the antenna 10 by the BT module 130 via the through path between the ports 36 and 38, the port 3, and the BT Rx front-end 154 in sequence. Subsequent to step S1112, if not, it is determined whether the WiFi module 120 and the BT module 130 occupy the time period for Tx and Rx operations, respectively (step S1115). If so, the control unit 1010 sends control signals to activate the WiFi Tx front-end 151 and the BT Rx front-end 154, switch the balun-switch unit 163 to the BT Rx front-end 154, switch the switching device 1020 to the port 1, and switch the switching device 1040 to the port 32 or 38 for the time period (mode 7) (step S1116), thereby enabling the WiFi Tx signals to be transmitted from the WiFi module 120 via the WiFi Tx front-end 151, the port 1, and the through path between the ports 32 and 34 in sequence to the antenna 10, along with the BT Rx signals to be received from the antenna 10 by the BT module 130 via the through path between the ports 36 and 38, the port 3, and the BT Rx front-end 154 in sequence. Subsequent to step S1114, if not, it is determined whether both the WiFi module 120 and the BT module 130 occupy the time period for Tx operations (step S1117). If so, the control unit 1010 sends control signals to activate the WiFi Tx front-end 151 and the BT Tx front-end 155, switch the balun-switch unit 163 to the BT Tx front-end 155, switch the switching device 1020 to the port 1, and switch the switching device 1040 to the port 32 or 38 for the time period (mode 8) (step S1118), thereby enabling the WiFi Tx signals to be transmitted from the WiFi module 120 via the WiFi Tx front-end 151, the port 1, and the through path between the ports 32 and 34 in sequence to the antenna 10, along with the BT Tx signals to be transmitted from the BT module 130 via the BT Tx front-end 155, the port 3, and the through path between the ports 36 and 38 in sequence to the antenna 10.

Subsequent to step S1110, if not, it is determined whether the WiFi module 120 and the BT module 130 occupy the time period for Rx and Tx operations, respectively (step S1119). If so, the control unit 1010 determines whether a collision has occurred in the traffic requests from the WiFi module 120 and the BT module 130, and arbitrates which traffic request is to be granted when a collision has occurred (step S1120). If the granted traffic request is from the WiFi module 120, the control unit 1010 sends control signals to activate the WiFi/BT Rx front-end 152, switch the balun-switch unit 162 to the WiFi/BT Rx front-end 152, switch the switching device 1020 to the port 2, and switch the switching device 1040 to the port 32 for the time period (mode 9) (step S1121), thereby enabling the WiFi Rx signals to be received from the antenna 10 by the WiFi module 120 via the through path between the ports 32 and 34, the port 2, the WiFi/BT Rx front-end 152, and the separator 140 in sequence. If the granted traffic request is from the BT module 130, the control unit 110 sends control signals to activate the BT Tx front-end 153, switch the balun-switch unit 162 to the BT Tx front-end 153, switch the switching device 1020 to the port 2, and switch the switching device 1040 to the port 32 for the time period (mode 9) (step S1122), thereby enabling the BT Tx signals to be transmitted from the BT module 130 via the BT Tx front-end 153, the port 2, and the through path between the ports 32 and 34 in sequence to the antenna 10. Subsequent to step S1119, if not, it is determined whether both the WiFi module 120 and the BT module 130 occupy the time period for Rx operations (step S1123). If so, the control unit sends control signals to activate the WiFi/BT Rx front-end 152, switch the balun-switch unit 162 to the WiFi/BT Rx front-end 152, switch the switching device 1020 to the port 2, and switch the switching device 1040 to the port 32 for the time period (mode 10) (step S1124), thereby enabling a combined signal to be received from the antenna 10 by the separator 140 via the through path between ports 32 and 34, the port 2, and the WiFi/BT Rx front-end 152 in sequence. Thereafter, the separator 140 separates them into the WiFi and BT Rx signals and further forwarded to the WiFi module 120 and BT module 130, respectively. Subsequent to step S1123, if not, it is determined whether the WiFi module 120 and the BT module 130 occupy the time period for Tx and Rx operations, respectively (step S1125). If so, the control unit 1010 determines whether a collision has occurred in the traffic requests from the WiFi module 120 and the BT module 130, and arbitrates which traffic request is to be granted when a collision has occurred (step S1126). If the granted traffic request is from the WiFi module 120, the control unit 1010 sends control signals to activate the WiFi Tx front-end 151, switch the switching device 1020 to the port 1, and switch the switching device 1040 to the port 32 for the time period (mode 11) (step S1127), thereby enabling the WiFi Tx signals to be transmitted from the WiFi module 120 via the WiFi Tx front-end 151, the port 1, and the through path between the ports 32 and 34 in sequence to the antenna 10. If the granted traffic request is from the BT module 130, the control unit 1010 sends control signals to activate the WiFi/BT Rx front-end 152, switch the balun-switch unit 162 to the WiFi/BT Rx front-end 152, switch the switching device 1020 to the port 2, and switch the switching device 1040 to the port 32 for the time period (mode 11) (step S1128), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S1125, if not, it is determined whether both the WiFi module 120 and the BT module 130 occupy the time period for Tx operations (step S1129). If so, the control unit 1010 determines whether a collision has occurred in the traffic requests from the WiFi module 120 and the BT module 130, and arbitrates which traffic request is to be granted when a collision has occurred (step S1130). If the granted traffic request is from the WiFi module 120, the control unit 1010 sends control signals to activate the WiFi Tx front-end 151, switch the switching device 1020 to the port 1, and switch the switching device 1040 to the port 32 for the time period (mode 12) (step S1131), thereby enabling the WiFi Tx signals to be transmitted from the WiFi module 120 via the WiFi Tx front-end 151, the port 1, and the through path between the ports 32 and 34 in sequence to the antenna 10. If the granted traffic request is from the BT module 130, the control unit 1010 sends control signals to activate the BT Tx front-end 153, switch the balun-switch unit 162 to the BT Tx front-end 153, switch the switching device 1020 to the port 2, and switch the switching device 1040 to the port 32 for the time period (mode 12) (step S1132), thereby enabling the BT Tx signals to be transmitted from the BT module 130 via the BT Tx front-end 153, the port 2, and the through path between the ports 32 and 34 in sequence to the antenna 10.

Without departing from the spirit of the invention, other embodiments of a method for the coexistence between the Bluetooth module 412 and the WiMAX module 424 handled by the control unit can be devised with relevant modifications according to the architectures in FIGS. 4 and 10, and the control flows in FIGS. 8A to 8G and 11A to 11G.

Figure 12:
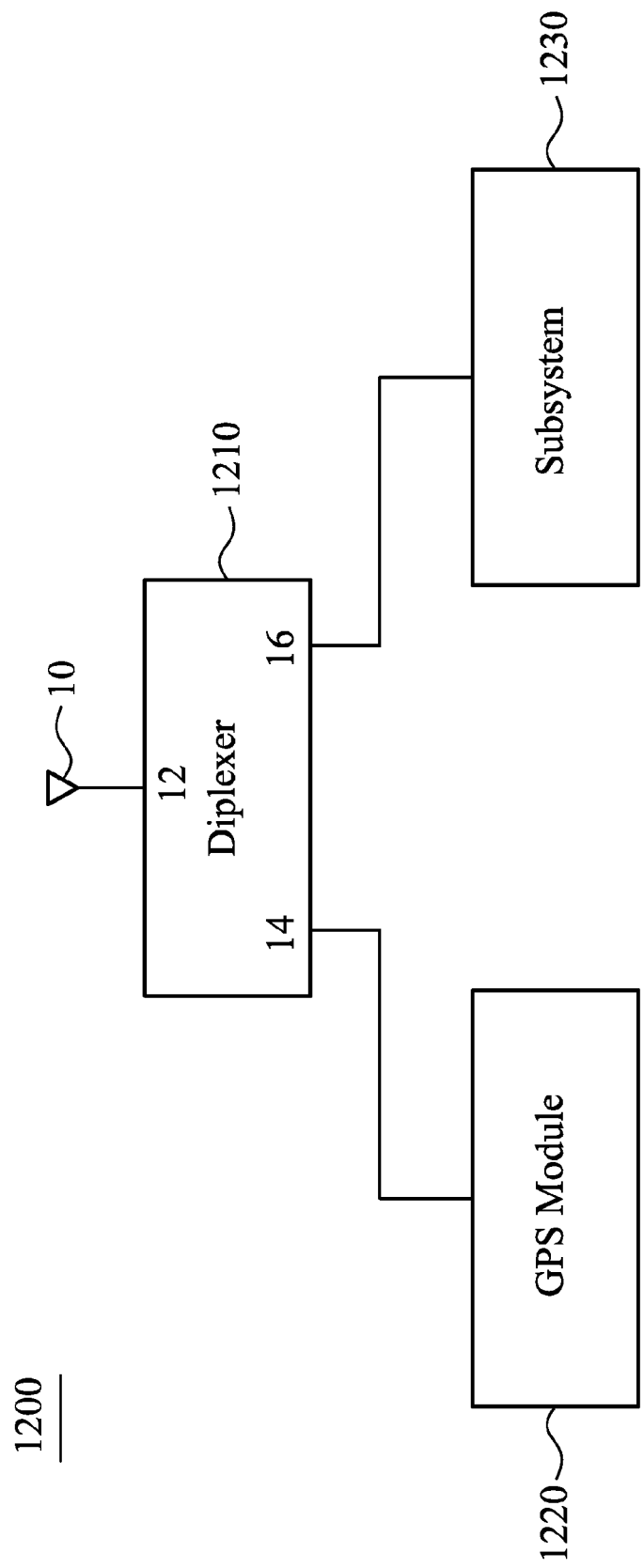
FIG. 12 shows a system for coexistence between a Global Positioning System (GPS) and a subsystem sharing a single antenna according to an embodiment of the invention.

Although the WiFi and BT wireless communication services are used for illustration of the invention, other wireless communication services can be used, such as Global Positioning System (GPS). FIG. 12 shows another embodiment of a system for the coexistence between a Global Positioning System (GPS) and a subsystem sharing a single antenna, wherein the subsystem may be any one of the systems 400 and 1000 excluding the antenna 10. The system 1200 comprises an antenna 10, a diplexer 1210, a GPS module 1220, and a subsystem 1230. The diplexer 1210, which consists of three terminals 12, 14, and 16, is configured to connect the terminal 12 to both terminals 14 and 16 such that the GPS signals (Tx or Rx signal) are transmitted to/received from the shared antenna 10 via the diplexer 1210, and the wireless signals of the subsystem 1230 (Tx or Rx signal) are simultaneously transmitted to/received from the shared antenna 10 via the diplexer 1210.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for the coexistence between a plurality of wireless communications modules sharing an antenna, comprising:
   at least one wireless communications chipset, comprising:
      a first wireless communications module configured to transmit and receive first wireless signals via a first transceiving path and a second transceiving path, wherein the first transceiving path includes a first transmitting path for transmitting the first wireless signals from the first wireless communications module to the antenna and a first receiving path for receiving the first wireless signals from the antenna to the first wireless communications module; and
      a second wireless communications module configured to transmit and receive second wireless signals; and
   a path selection circuit configured to connect the first wireless communications module to the antenna selectively via one of the first transceiving path and the second transceiving path respectively for transmitting or receiving the first wireless signals from or to the first wireless communications module according to transceiving statuses of the first wireless signals and the second wireless signals being transmitted to or received from the second wireless communications module, wherein a signal passing through the first transceiving path has less signal loss than passing through the second transceiving path, and the first transceiving path including the first receiving path and the first transmitting path shares an input/output (I/O) port of the wireless communications chipset with the second wireless communications module.

2. The system as claimed in claim 1, wherein the transceiving statuses are wanted powers, received signal strength indications (RSSIs), packet error rates (PERs), bit error rates (BERs), signal-to-noise ratios (SNRs), or interference-to-signal ratios (ISRs) of the first wireless signals and the second wireless signals.

3. The system as claimed in claim 1, wherein the path selection circuit is further configured to connect the first wireless communications module to the antenna via the first transceiving path if the second wireless communications module is not transmitting or receiving the second wireless signals.

4. The system as claimed in claim 1, wherein the path selection circuit is further configured to connect the second wireless communications module to the antenna via a third transceiving path for transmitting the second wireless signals, or via the first transceiving path for receiving the second wireless signals.

5. The system as claimed in claim 1, wherein the path selection circuit is further configured to connect a separator of the wireless communications chipset to the antenna via the first transceiving path for receiving a combined wireless signal, separating the combined wireless signal into the first and second wireless signals, and sending the first and second wireless signals to the first and second wireless communications modules, respectively.

6. The system as claimed in claim 4, wherein the path selection circuit comprises:
   a connection device having a first port connected to the antenna, a second port coupled to the first port, and a third port coupling the second transceiving path to the first port; and
   a switching device configured to selectively connect the first and third transceiving path to the second port.

7. The system as claimed in claim 6, wherein the connection device is a directional coupler, the first and second ports are coupled via a through path having a first path loss, and the first and third port are coupled via a coupled path having a second path loss smaller than the first path loss.

8. The system as claimed in claim 7, wherein the connection device is a 10 dB directional coupler, the first path loss is 0.5 dB and the second path loss is 10 dB substantially.

9. The system as claimed in claim 7, wherein the directional coupler further comprises a fourth port isolated from the first port, coupled to the second port via another coupled path, coupled to the third port via another through path, and connected to an external node for impedance matching.

10. The system as claimed in claim 9, wherein the external node is a 50Ω resistor or a 50Ω equivalent termination.

11. The system as claimed in claim 6, wherein the connection device is a power splitter, the first and second ports are connected with a first path loss, and the first and third ports are connected with a second path loss different from the first path loss.

12. The system as claimed in claim 6, wherein the switching device is a single-pole double-thrown (SPDT) switch.

13. The system as claimed in claim 6, wherein the switching device is a double-pole double-thrown (DPDT) switch with a terminal connected to an external node for impedance matching.

14. The system as claimed in claim 13, wherein the external node is a 50Ω resistor or a 50Ω equivalent termination.

15. The system as claimed in claim 4, wherein the path selection circuit comprises:
   a first switching device having a first terminal connected to the antenna, and configured to selectively connect the first terminal to a second and third terminal;
   a connection device having a first port connected to the second terminal, a second port coupled to the first port, a third port connected to the second transceiving path, and a fourth port coupling the third port to the third terminal; and
   a second switching device configured to selectively connect the first and third transceiving path to the second port.

16. A system for the coexistence between a plurality of wireless communications modules sharing an antenna, comprising:
   a path selection circuit providing a first transceiving path and a second transceiving path to the antenna, wherein a signal passing through the first transceiving path has less signal loss than passing through the second transceiving path, the first transceiving path includes a first transmitting path for transmitting the first wireless signals from the first wireless communications module to the antenna and a first receiving path for receiving the first wireless signals from the antenna to the first wireless communications module; and a wireless communications chipset, comprising:
a first port coupling the first transceiving path;
a second port coupling the second transceiving path;
a first wireless communications module coupling to the first and second ports; and
a control unit selectively enabling one of the first and second ports for a time period, enabling one of signal transmission or reception for the time period by the first wireless communications module via the first or second transceiving path;
wherein the first transceiving path including the first receiving path and the first transmitting path shares the first port with a second wireless communications module.

17. The system as claimed in claim 16, wherein the wireless communication chipset further comprises:
a first front end coupling the first port, the first wireless communications module and the control unit; and
a second front end coupling the second port,
wherein the first port is enabled by activating the first front end, and the second port is enabled by activating the second front end.

18. The system as claimed in claim 17, wherein the first front end is capable of modulating or demodulating signals, and the second front end is capable of modulating or demodulating signals.

19. The system as claimed in claim 16, wherein the wireless communications chipset further comprises a second wireless communications module coupling the first port, and the control unit enables the first port for the time period when the second wireless communications module performs no signal transmission and reception for the time period.

20. The system as claimed in claim 16, wherein the wireless communications chipset further comprises a second wireless communications module couples the first port, and the control unit enables the first and second ports for the time period when the second wireless communications module performs signal transmission or reception for the time period.

21. The system as claimed in claim 20, wherein the first wireless communications module transmits or receives signals via the second port, and the second wireless communications module transmits or receives signals via the first port.

22. The system as claimed in claim 16, wherein the first wireless communications module is a Bluetooth module and the second wireless communications module is a WiFi module.

23. A method for handling the coexistence between a plurality of wireless communications modules sharing an antenna, comprising:
determining whether a first wireless communications module is transmitting or receiving a first wireless signal, and a second wireless communications module is transmitting or receiving a second wireless signal;
determining transceiving statuses of the first and second wireless signals; and
connecting the first wireless communications module to the antenna via one of a first transceiving path and a second transceiving path respectively for transmitting and receiving the first wireless signal according to the transceiving statuses, wherein a signal passing through the first transceiving path has less signal loss than passing through the second transceiving path;
wherein the first transceiving path includes a first transmitting path for transmitting the first wireless signals from the first wireless communications module to the antenna and a first receiving path for receiving the first wireless signals from the antenna to the first wireless communications module, and the first transceiving path including the first receiving path and the first transmitting path shares an input/output (I/O) port with the second wireless communications module.

24. The method as claimed in claim 23, wherein the transceiving statuses are wanted powers, received signal strength indications (RSSIs), packet error rates (PERs), bit error rates (BERs), signal-to-noise ratios (SNRs), or interference-to-signal ratios (ISRs) of the first wireless signal and the second wireless signal.

25. The method as claimed in claim 23, further comprising connecting the first wireless communications module to the antenna via the first transceiving path if the second wireless communications module is not transmitting or receiving the second wireless signal.

26. The method as claimed in claim 23, further comprising connecting the second wireless communications module to the antenna via a third transceiving path for transmitting the second wireless signal, and via the first transceiving path for receiving the second wireless signal.

27. The method as claimed in claim 23, further comprising connecting a separator to the antenna via the first transceiving path for receiving a combined wireless signal, separating the combined wireless signal into the first and second wireless signals, and sending the first and second wireless signals to the first and second wireless communications modules, respectively.

28. The method as claimed in claim 23, wherein the first transceiving path has a path loss of substantially 0.5 dB, and the second transceiving path has a path loss of substantially 10 dB.

29. The method as claimed in claim 26, wherein the third transceiving path has a path loss of substantially 0.5 dB.

30. The method as claimed in claim 23, wherein the first wireless communications module is one of a WiFi module or a Bluetooth module, and the second wireless communications module is the other of the WiFi or Bluetooth modules.

* * * * *